(12) United States Patent
Yang et al.

(10) Patent No.: US 11,622,367 B2
(45) Date of Patent: Apr. 4, 2023

(54) CROSS-CARRIER SCHEDULING IN WIRELESS COMMUNICATION

(71) Applicant: QUALCOMM Incorporated, San Diego, CA (US)

(72) Inventors: Wei Yang, San Diego, CA (US); Huilin Xu, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/091,918

(22) Filed: Nov. 6, 2020

(65) Prior Publication Data

US 2021/0144745 A1 May 13, 2021

Related U.S. Application Data

(60) Provisional application No. 62/933,243, filed on Nov. 8, 2019.

(51) Int. Cl.
| | | |
|---|---|---|
| *H04L 12/28* | (2006.01) | |
| *H04W 72/12* | (2023.01) | |
| *H04W 72/044* | (2023.01) | |
| *H04L 27/26* | (2006.01) | |

(52) U.S. Cl.
CPC ..... *H04W 72/1289* (2013.01); *H04W 72/044* (2013.01); *H04L 27/2605* (2013.01)

(58) Field of Classification Search
CPC ................................ H04L 12/28; H04L 12/50

USPC ........................................................ 370/329
See application file for complete search history.

(56) References Cited

U.S. PATENT DOCUMENTS

| 11,265,837 B2 * | 3/2022 | Cui .................. H04W 56/0045 |
| 2017/0238304 A1 | 8/2017 | Ling et al. |

OTHER PUBLICATIONS

International Search Report and Written Opinion—PCT/US2020/059578—ISA/EPO—dated Jan. 28, 2021.
Qualcomm Incorporated: "CA with Mixed Numerology", 3GPP TSG-RAN WG1 Meeting #90, 3GPP Draft; R1-1713456_CA Mixed Numerology, 3rd Generation Partnership Project (3GPP), Mobile Competence Centre; 650, Route Des Ludoles; F-06921 Sophia-Antipolis Cedex; France, vol. RAN WG1, No. Prague, Czech Republic; Aug. 21, 2017-Aug. 25, 2017, Aug. 20, 2017 (Aug. 20, 2017), XP051316258, Retrieved from the Internet: URL:https://www.3gpp.org/ftp/Meetings_3GPP_SYNC/RAN1/Docs/ [retrieved on Aug. 20, 2017], 6 Pages, figures 1-3, Sections 1-4.

(Continued)

*Primary Examiner* — Dang T Ton
(74) *Attorney, Agent, or Firm* — Loza & Loza, LLP

(57) ABSTRACT

Aspects relate to cross-carrier scheduling in wireless communication. A scheduling entity generates scheduling information that schedules a plurality of data transmissions to or from a user equipment (UE) on a first carrier having a first numerology. The scheduling entity then transmits the scheduling information to the UE on a second carrier having a second numerology different than (e.g., less than) the first numerology. The scheduling information is transmitted using control resources allocated based on slot indexes of a plurality of slots configured for communicating the data transmissions on the first carrier.

30 Claims, 18 Drawing Sheets

(56) References Cited

OTHER PUBLICATIONS

Qualcomm Incorporated, "Cross-Carrier Scheduling with Different Numerologies", 3GPP TSG-RAN WG1 #96bis, 3GPP Draft; R1-1905279, Cross Carrier Scheduling With Different Numerologies, 3rd Generation Partnership Project (3GPP), Mobile Competence Centre; 650, Route Des Tucioles; F-06921 Sophia-Antipolis Cedex; France vol. RAN WG1, No. Xi'an, China; Apr. 8, 2019-Apr. 12, 2019, Apr. 7, 2019 (Apr. 7, 2019), XP051700348, Retrieved from the Internet: URL: http://www.3gpp.org/ftp/Meetings% , 10 pages.

* cited by examiner

CROSS-CARRIER SCHEDULING IN WIRELESS COMMUNICATION

CROSS-REFERENCE TO RELATED APPLICATIONS

The present application for Patent claims priority to and the benefit of U.S. Provisional Application No. 62/933,243, titled "METHOD AND APPARATUS FOR CROSS-CARRIER SCHEDULING IN WIRELESS COMMUNICATION" filed Nov. 8, 2019, and assigned to the assignee hereof and hereby expressly incorporated by reference herein as if fully set forth below in its entirety and for all applicable purposes.

TECHNICAL FIELD

The technology discussed below relates generally to wireless communication systems, and more particularly, to cross-carrier scheduling in wireless communication.

INTRODUCTION

In a Fifth Generation (5G) New Radio (NR) network, a base station and a user equipment (UE) may communicate over a carrier that may be time-divided into a plurality of frames, subframes, slots, and symbols. The base station may schedule data transmissions to and/or from the UE within one or more slots of the carrier and transmit scheduling information indicating the resources (e.g., time-frequency resources) scheduled for the data transmissions using downlink control information (DCI). The UE may detect the DCI in a predetermined search space.

In some wireless communication networks, a user equipment (UE) may be configured to combine multiple carriers to increase transmission bandwidth over that of a single carrier. One such method is called carrier aggregation (CA) in which multiple carriers are aggregated, bundled, or combined to provide a wider transmission bandwidth that can facilitate a higher peak data rate and/or overall capability.

Each carrier waveform may utilize the same or different numerology. The numerology of a waveform refers to the subcarrier spacing and cyclic prefix (CP) overhead of the waveform. Different subcarrier spacings may be associated with different symbol durations, including the CP length. For example, a scalable numerology may support a subcarrier spacing ranging from 15 kHz to 480 kHz.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a scheduling entity in a wireless communication network is disclosed. The method can include generating scheduling information that schedules communication of a plurality of data transmissions with a user equipment (UE) on a plurality of slots of a first carrier including a first numerology. Each of the plurality of data transmissions can correspond to a respective one of the plurality of slots. The method can further include transmitting the scheduling information within control resources allocated based on slot indexes of the plurality of slots on a second carrier including a second numerology less than the first numerology.

Another example provides a method of wireless communication at a user equipment (UE) in a wireless communication network. The method can include receiving scheduling information on a first carrier including a first numerology. The scheduling information can schedule communication of a plurality of data transmissions with the UE on a plurality of slots of a second carrier including a second numerology greater than the first numerology. Each of the plurality of data transmissions can correspond to a respective one of the plurality of slots. The method can further include determining relative timing positions of the plurality of slots based on an association between the plurality of slots and control resources allocated to the scheduling information, and decoding the scheduling information in an order based on the relative timing positions of the plurality of slots.

Another aspect of the present disclosure provides an apparatus for cross-carrier scheduling in a wireless communication network. The apparatus includes a transceiver configured to communicate with a user equipment (UE) using a first carrier including a first numerology and a second carrier including a second numerology less than the first numerology. The apparatus further includes a memory and a processor coupled to the transceiver and the memory. The processor and the memory can be configured to generate scheduling information that schedules communication of a plurality of data transmissions with the UE on a plurality of slots of the first carrier. Each of the plurality of data transmissions can correspond to a respective one of the plurality of slots. The processor and the memory can further be configured to transmit the scheduling information within control resources allocated based on slot indexes of the plurality of slots on the second carrier.

Another aspect of the present disclosure provides a user equipment (UE) for wireless communication. The UE includes a transceiver configured to communicate with a scheduling entity using a first carrier including a first numerology and a second carrier including a second numerology greater than the first numerology. The UE further includes a memory and a processor coupled to the transceiver and the memory. The processor and the memory can be configured to receive scheduling information on the first carrier. The scheduling information can schedule communication of a plurality of data transmissions with the UE on a plurality of slots of the second carrier. Each of the plurality of data transmissions can correspond to a respective one of the plurality of slots. The processor and the memory can further be configured to determine relative timing positions of the plurality of slots based on an association between the plurality of slots and control resources allocated to the scheduling information, and decode the scheduling information in an order based on the relative timing positions of the plurality of slots.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
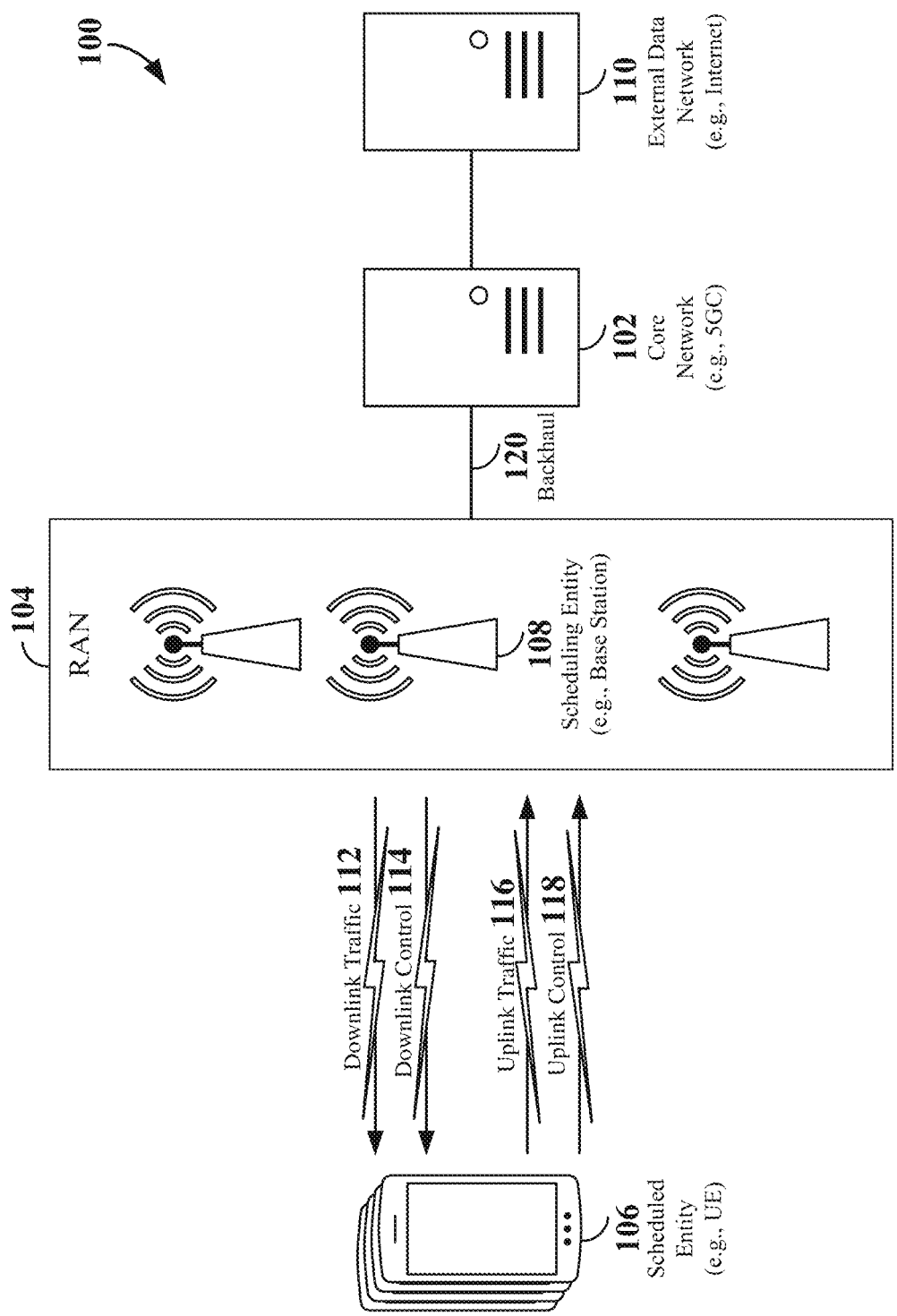
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
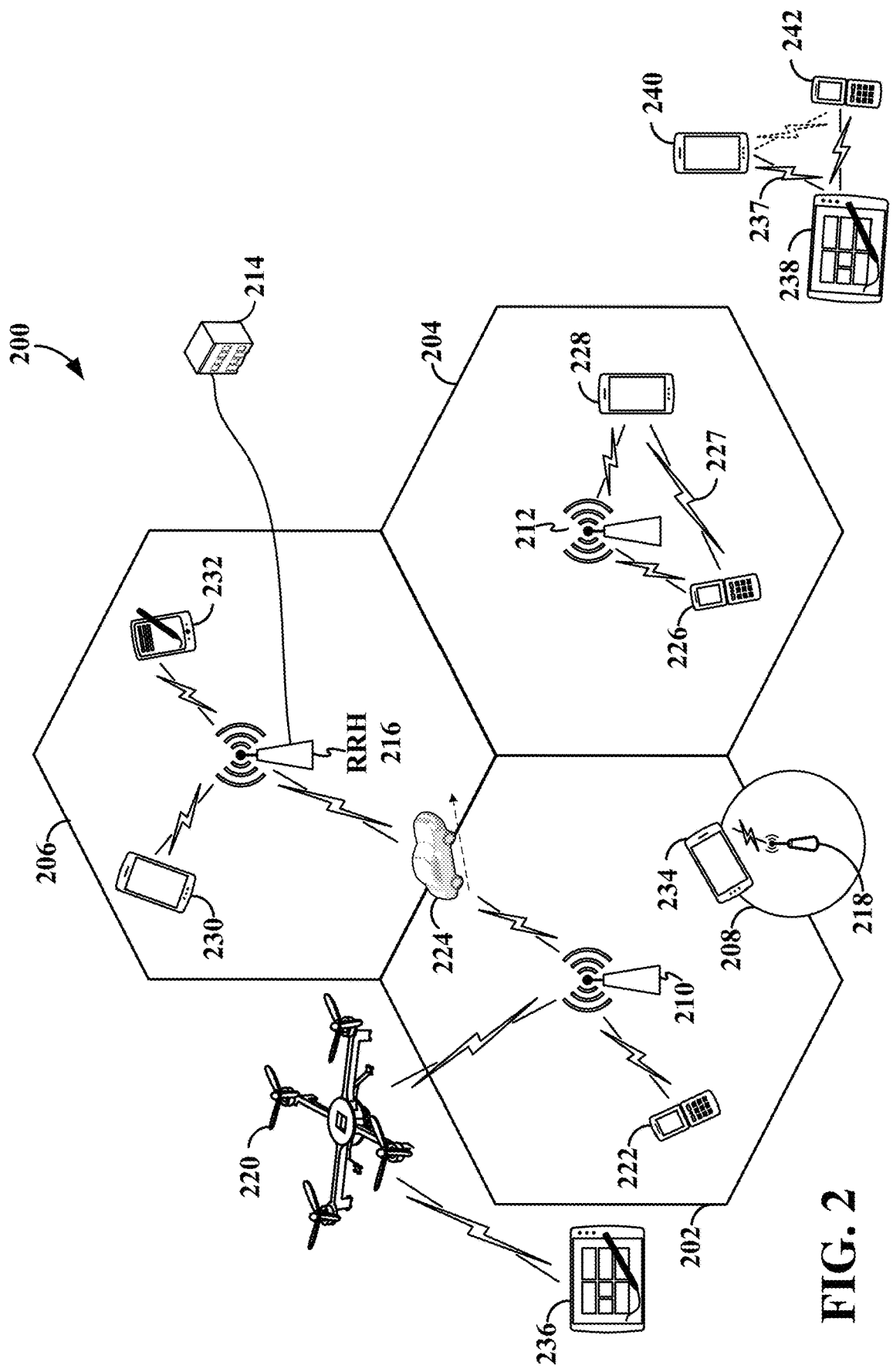
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. In some examples, the RAN 200 may be a 5G NR RAN. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs for downlink, uplink, or sidelink transmissions typically involves scheduling one or more REs 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
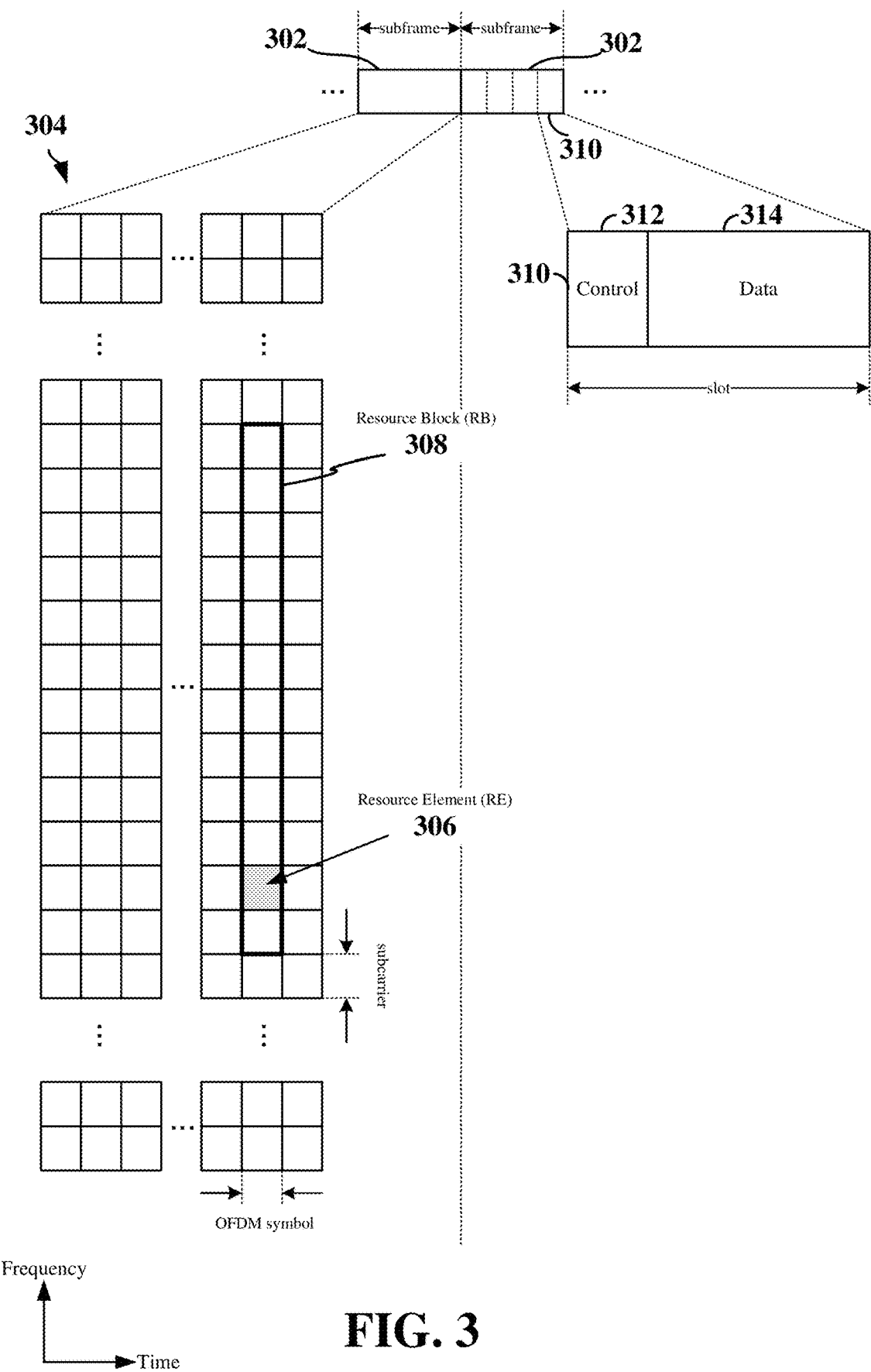
FIG. 3 is a schematic illustration of an organization of wireless resources in an air interface utilizing orthogonal frequency divisional multiplexing (OFDM) according to some aspects.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, a base station may use the PDCCH on one subcarrier to schedule the PDSCH or PUSCH on one or more other subcarriers in cross-carrier scheduling applications.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
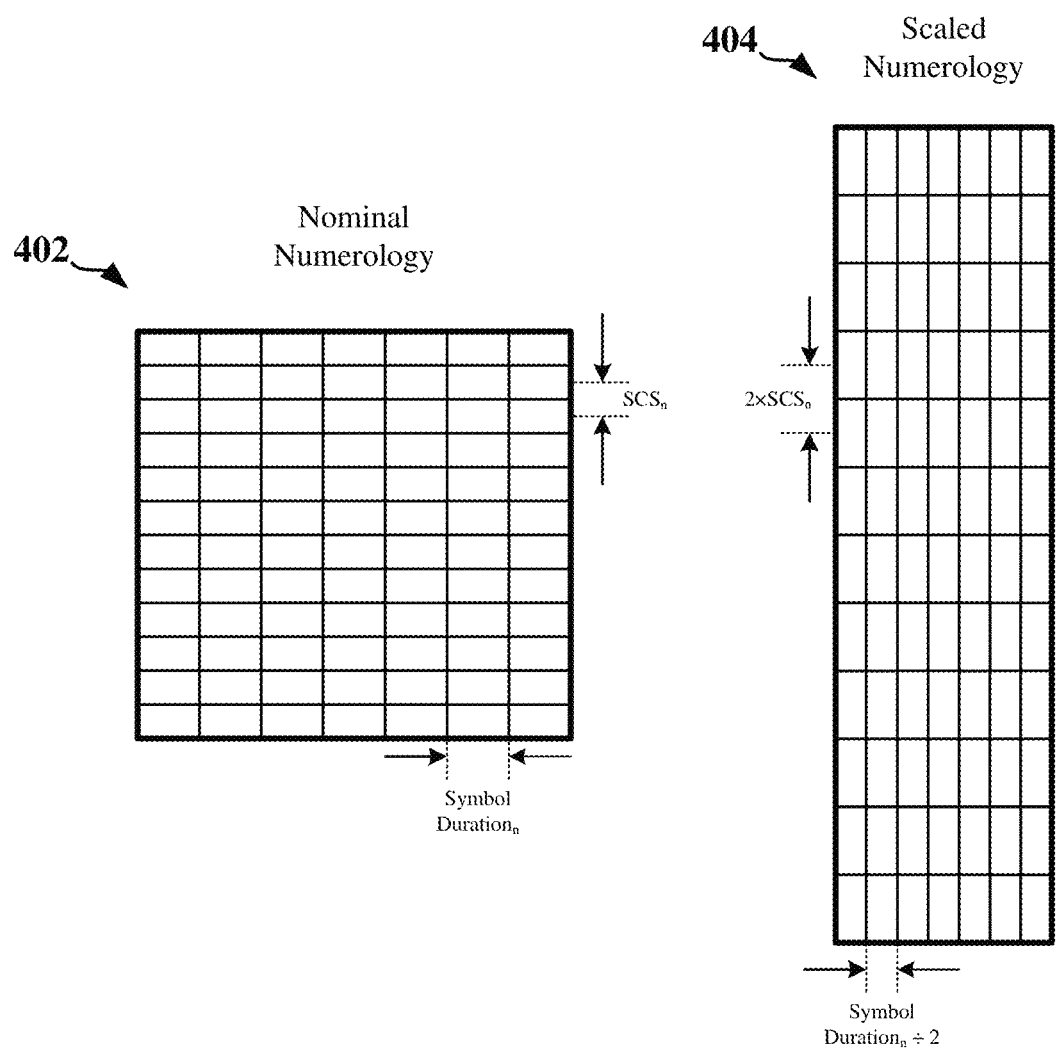
FIG. 4 is a schematic illustration of an OFDM air interface utilizing a scalable numerology according to some aspects.

To illustrate this concept of a scalable numerology, FIG. 4 shows a first RB 402 having a nominal numerology, and a second RB 404 having a scaled numerology. As one example, the first RB 402 may have a 'nominal' subcarrier spacing ($SCS_n$) of 30 kHz, and a 'nominal' symbol duration$_n$ of 333 µs. Here, in the second RB 404, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration$_n$)÷2=167 µs.

In 5G NR, a control resource set (CORESET) is a set of physical resources (e.g., a group of RBs or REs) configured to carry a PDCCH. Each PDCCH carries one DCI and may be identified by a radio network temporary identifier (RNTI). In some examples, a CORESET may be localized to a certain region in the frequency domain (e.g., a bandwidth part (BWP)). A CORESET may be configured with a number of parameters including REs, resource element group (REGs), REG bundles, control channel elements (CCEs), and aggregation level. One REG may include one RB and one OFDM symbol in time domain. A REG bundle includes multiple REGs, while a CCE includes multiple REGs. The number of REG bundles within a CCE may vary. An aggregation level indicates how many CCEs are allocated for a PDCCH. A search space indicates the set of CCE locations where a UE may find a PDCCH (e.g., a PDCCH candidate) for that UE. There are two types of search space: the common search space (CSS) and the UE-specific search space (USS). A UE monitors both the CSS and USS for a PDCCH.

Figure 5:
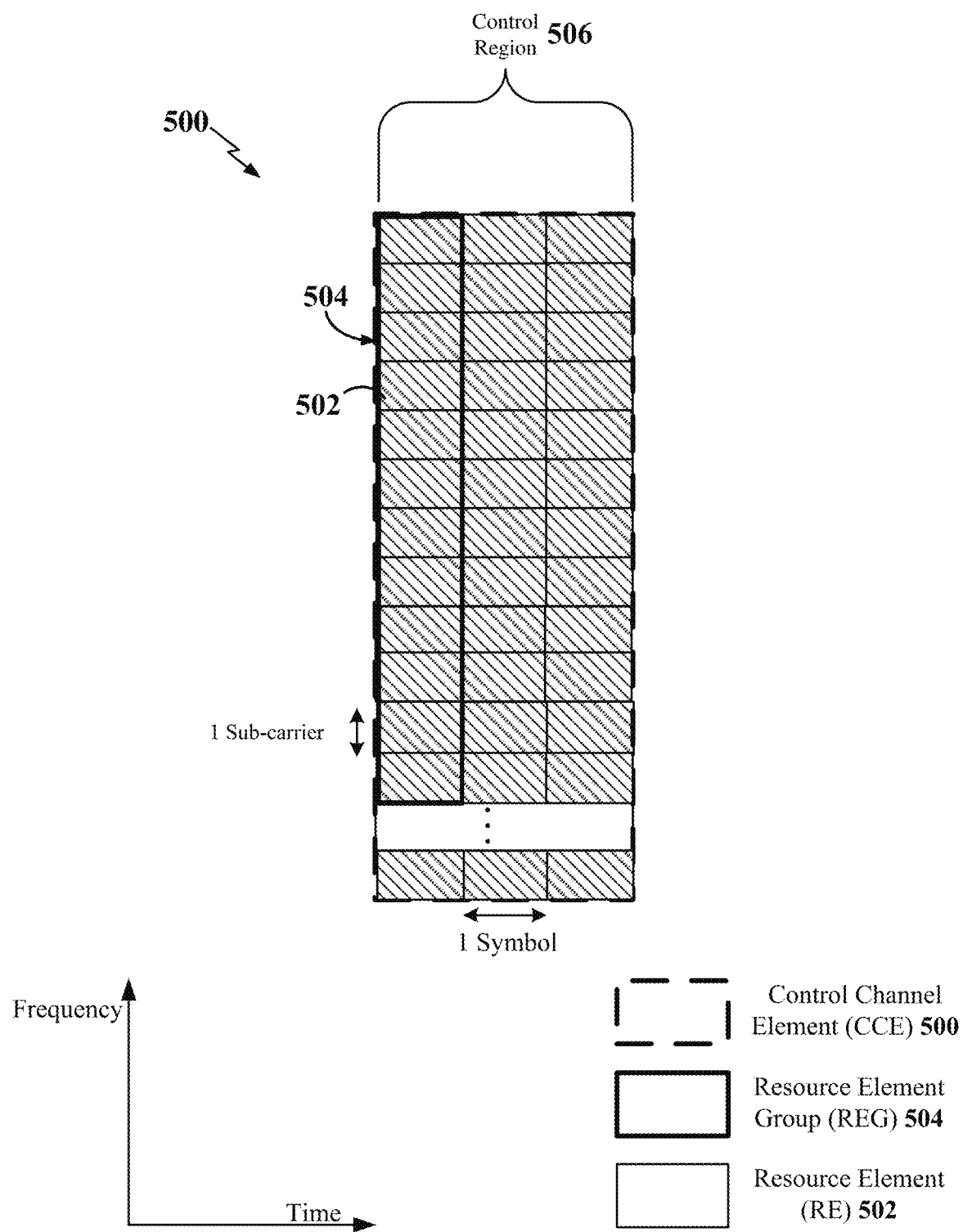
FIG. 5 is a schematic illustration of an example CCE structure in a DL control portion of a slot according to some aspects.

FIG. 5 is a schematic illustration of an example CCE 500 structure in a DL control portion 506 of a slot according to some aspects. The slot may correspond, for example, to the slot illustrated in FIG. 3. The CCE 500 structure of FIG. 5 represents a portion of the DL control portion 506, including a number of REs 502 that may be grouped into REGs 504. Each REG 504 generally may contain, for example, twelve consecutive REs 502 (or nine REs 502 and three DMRS REs) within the same OFDM symbol and the same RB. In this example, the CCE structure 500 includes at least six REGs 504 distributed across three OFDM symbols. However, as those skilled in the art will readily appreciate, the CCE 500 structure for any particular application may vary from the example described herein, depending on any number of factors. For example, the CCE 500 structure may contain any suitable number of REGs.

In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, 8, and 16 may be supported, corresponding to 1, 2, 4, 8, or 16 contiguous CCEs, respectively.

Since the UE is unaware of the particular aggregation level of the PDCCH or whether multiple PDCCHs may exist for the UE in the slot, the UE may perform blind decoding of various PDCCH candidates within the first N control OFDM symbols (as indicated by the slot format of the slot) based on an expected RNTI (e.g., UE-specific RNTI or group RNTI). Each PDCCH candidate includes a collection of one or more consecutive CCEs based on an assumed DCI length (e.g., PDCCH aggregation level). To limit the number of blind decodes, search spaces defining UE-specific search spaces (USSs) and common search spaces (CSSs) may be defined. The search space sets (e.g., USSs and CSSs) configured for a UE limit the number of blind decodes that the UE performs for each PDCCH format combination. The common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group and there may be multiple search space sets defined for group common control information (e.g., one for each configured aggregation level for the group of UEs).

Figure 6:
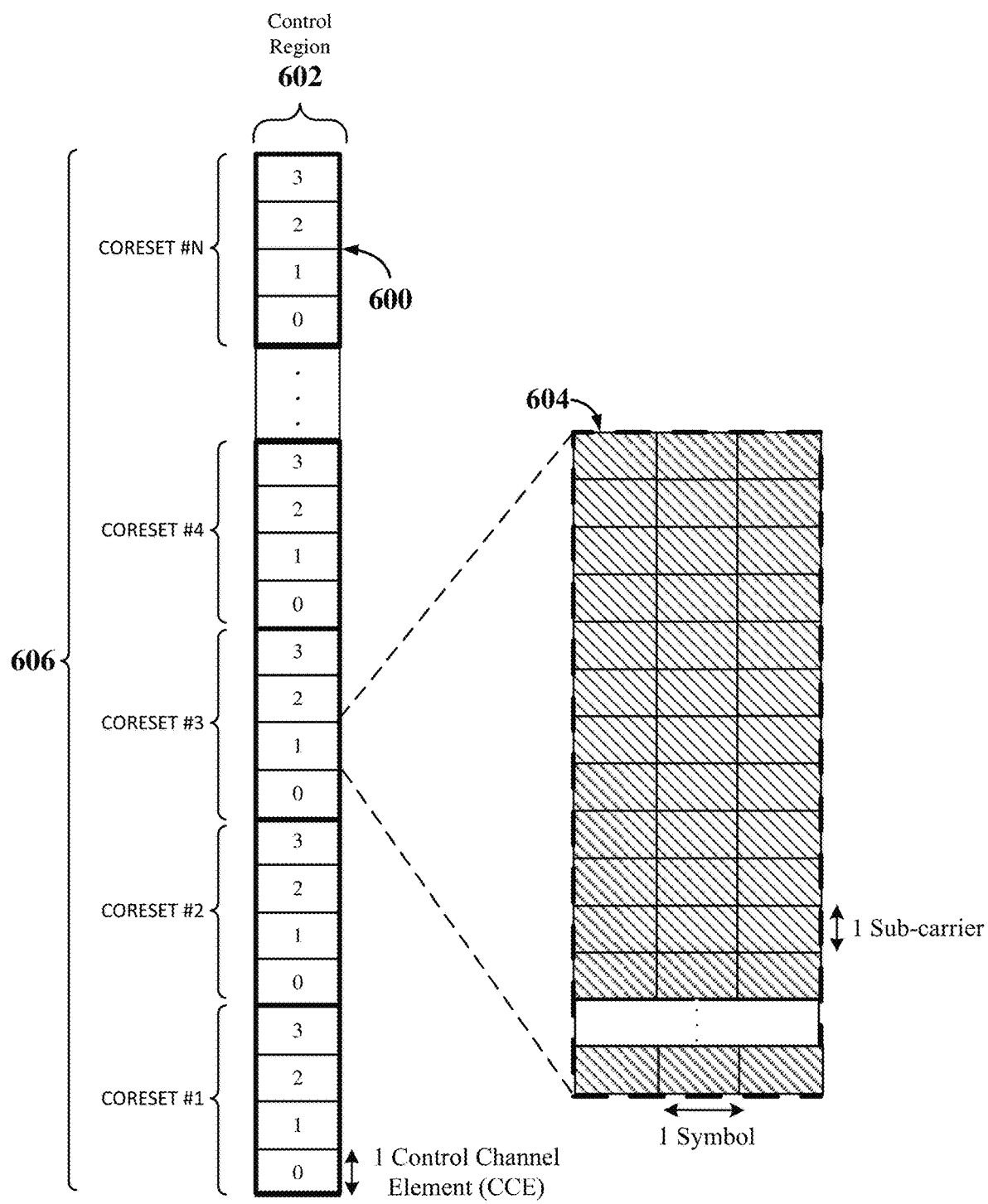
FIG. 6 is a schematic illustration of a number of example control-resource sets (CORESETs) of a DL control portion of a slot according to some aspects.

FIG. 6 is a schematic illustration of a number of example CORESETs 600 of a DL control portion 602 of a slot according to some aspects. The DL control portion 602 may correspond, for example, to the DL control portion illustrated in FIG. 3. A CORESET 600 may be configured for group common control information or UE-specific control information and may be used for transmission of a PDCCH including the group common control information or UE-specific control information to a set of one or more UEs. The UE may monitor one or more CORESETs 600 that the UE is configured to monitor for the UE-specific or group common control information.

Each CORESET 600 represents a portion of the DL control portion 602 including a number of sub-carriers in the frequency domain and one or more symbols in the time domain. In the example of FIG. 6, each CORESET 600 includes at least one CCE 604 having dimensions in both frequency and time, sized to span across at least three OFDM symbols. A CORESET having a size that spans across two or more OFDM symbols may be beneficial for use over a relatively small system bandwidth (e.g., 5 MHz). However, a one-symbol CORESET may also be possible.

A plurality of CORESETs 600 indexed as CORESET #1-CORESET #N are shown as occurring during three OFDM symbols in the time domain and occupying a first region of frequency resources in the frequency domain of the DL control portion 602. In the example shown in FIG. 6, each CORESET 600 include four CCEs 604. It should be noted that this is just one example. In another example, each CORESET 600 may include any suitable number of CCEs 604. The number of CCEs 604 and configuration of CCEs 604 for each CORESET 600 may be dependent, for example, on the aggregation level applied to the PDCCH.

A search space for a UE is indicated by a set of contiguous CCEs that the UE should monitor for downlink assignments and uplink grants relating to a particular component carrier for the UE. In the example shown in FIG. 6, the plurality of CORESETs 600 may form a search space 606, which may be a USS or a CSS. Within a USS, the aggregation level of a PDCCH may be, for example, 1, 2, 4, or 8 consecutive CCEs and within a CSS, the aggregation level of the PDCCH may be, for example 4 or 8 consecutive CCEs. In addition, the number of PDCCH candidates within each search space may vary depending on the aggregation level utilized. For example, for a USS with an aggregation level of 1 or 2, the number of PDCCH candidates may be 6. In this example, the number of CCEs in the USS search space 606 for an aggregation level of 1 may be 6, and the number of CCEs in the USS search space 606 for an aggregation level of 2 may be 12. However, for a USS with an aggregation level of 4 or 8, the number of PDCCH candidates may be 2. In this example, the number of CCEs in the USS search space 606 for an aggregation level of 4 may be 8, and the number of CCEs in the USS search space 606 for an aggregation level of 8 may be 16. For a CSS search space 606, the number of CCEs in the search space 606 may be 16 regardless of the aggregation level.

Figure 7:
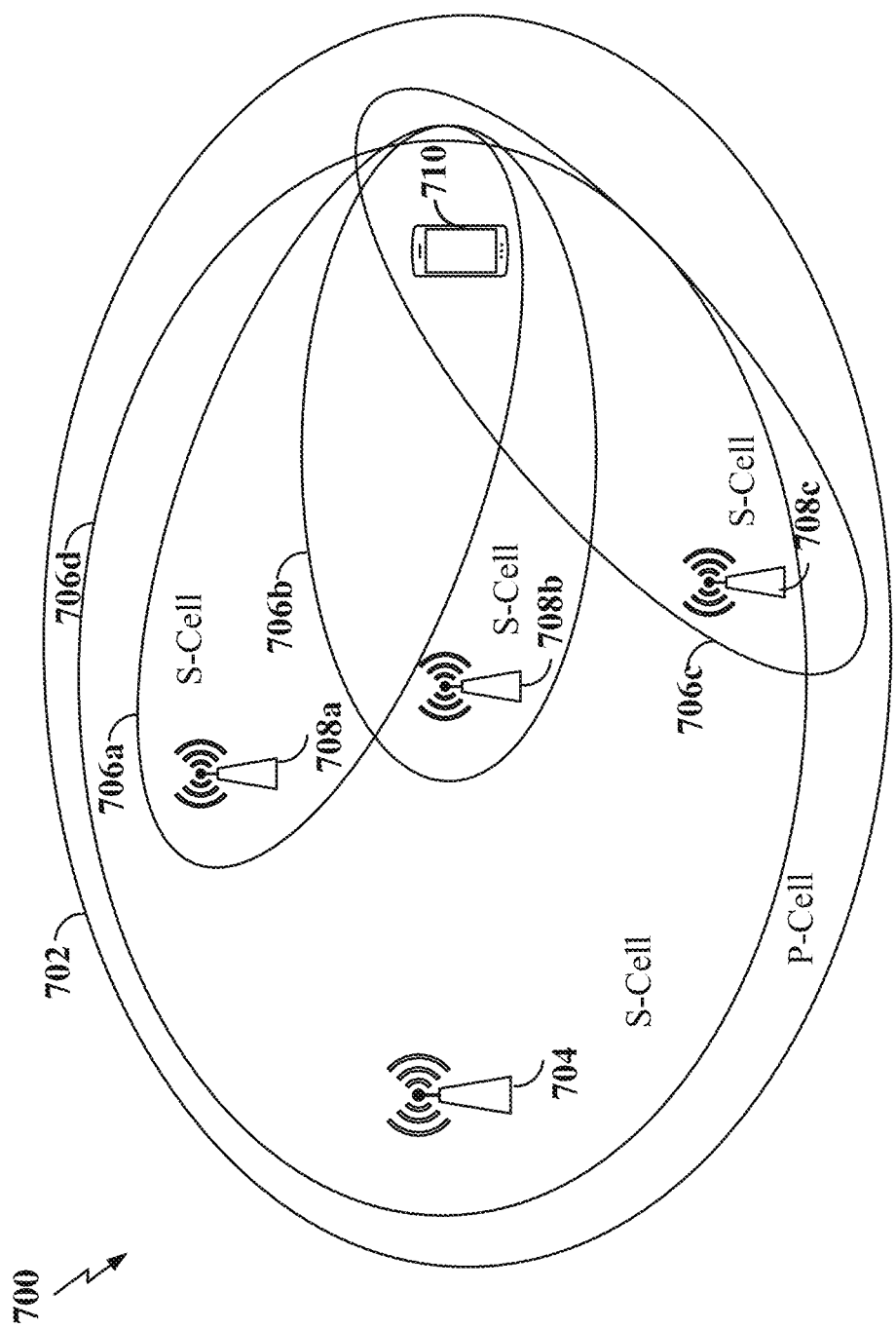
FIG. 7 is a diagram illustrating a multi-cell transmission environment according to some aspects.

5G-NR networks may further support carrier aggregation of component carriers transmitted from different transmission and reception points (TRPs) in a multi-cell transmission environment. An example of a multi-cell transmission environment 700 is shown in FIG. 7. The multi-cell transmission environment 700 includes a primary serving cell (PCell) 702 and one or more secondary serving cells (SCells) 706a, 706b, 706c, and 706d. The PCell 702 may be referred to as the anchor cell that provides a radio resource control (RRC) connection to a UE 710. In some examples, the PCell and one or more of the SCells may be collocated (e.g., different transmission reception point (TRPs) may be at the same location).

When carrier aggregation is configured, one or more of the SCells 706a-706d may be activated or added to the PCell 702 to form the serving cells serving the UE 710. Each serving cell corresponds to a component carrier (CC). The CC of the PCell 702 may be referred to as a primary CC, and the CC of a SCell 706a-706d may be referred to as a secondary CC. The PCell 702 and one or more of the SCells 706 may be served by a respective TRP 704 and 708a-708c. Each TRP 704 and 708a-708c may be a base station (e.g., gNB), remote radio head of a gNB, or other scheduling entity similar to those illustrated in any of FIG. 1 or 2. In some examples, a base station may include multiple TRPs, each corresponding to one of a plurality of collocated or non-collocated antenna arrays, each supporting a different component carrier. In the example shown in FIG. 7, SCells 706a-706c are served by respective non-collocated TRPs 708a-708c. In addition, SCell 706d and PCell 702 are collocated and served by respective collocated TRPs 704 (only one of which is shown for convenience). Here, each of the TRPs serving cells 702 and 706d may be associated with a single base station 704. The coverage of the PCell 702 and SCell 706d may differ since component carriers in different frequency bands may experience different path loss.

The PCell 702 may add or remove one or more of the SCells 706a-706d to improve reliability of the connection to the UE 710 and/or increase the data rate. However, the PCell 702 may only be changed upon a handover to another PCell. In some examples, the PCell 702 may utilize a first radio access technology (RAT), such as LTE, while one or more of the SCells 706 may utilize a second RAT, such as 5G-NR. In this example, the multi-cell transmission environment may be referred to as a multi-RAT-dual connectivity (MR-DC) environment. In some examples, the PCell 702 may be a low band cell, and the SCells 706 may be high band cells. A low band (LB) cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

The PCell 702 is responsible not only for connection setup, but also for radio resource management (RRM) and radio link monitoring (RLM) of the connection with the UE 710. For example, the PCell 702 may activate one or more of the SCells (e.g., SCell 706a) for multi-cell communication with the UE 710. In some examples, the PCell may activate the SCell 706a on an as-needed basis instead of maintaining the SCell activation when the SCell 706a is not utilized for data transmission/reception in order to reduce power consumption by the UE 710.

In some examples, a scheduling entity (e.g., base station 704) may use a carrier (e.g., component carrier) of one cell (e.g., the PCell 702) to schedule transmission of downlink and/or uplink data traffic on another carrier (e.g., another component carrier) of another cell (e.g., SCell 706d). Each carrier may utilize the same or different subcarrier spacing.

Figure 8:
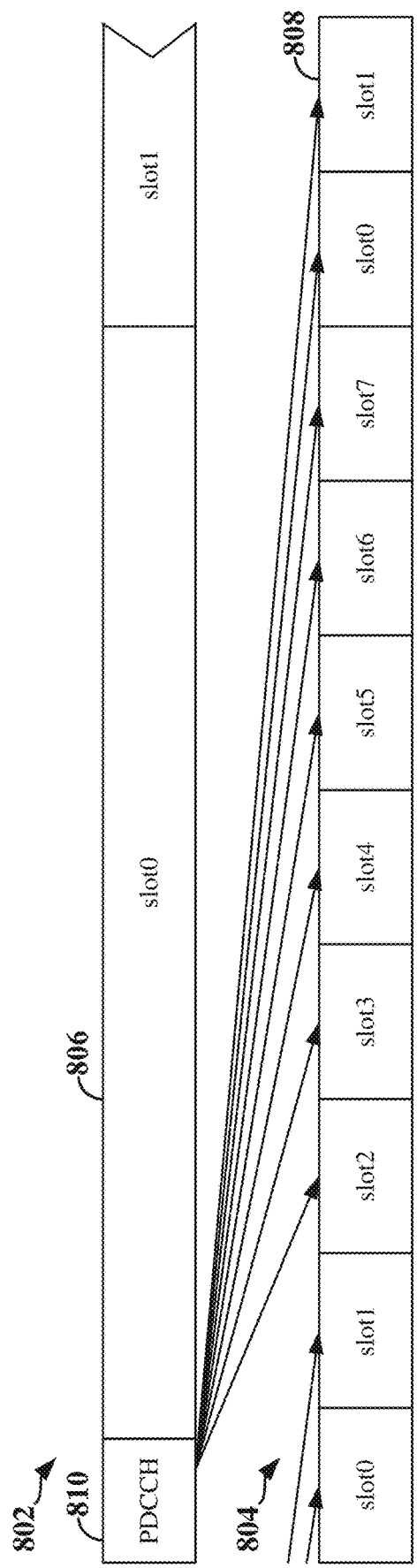
FIG. 8 is a diagram conceptually illustrating a cross-carrier scheduling example according to some aspects.

FIG. 8 is a diagram conceptually illustrating a cross-carrier scheduling example according to some aspects. A scheduling entity (e.g., base station) may use a first carrier 802 of a first cell (scheduling cell) with a lower subcarrier spacing (SCS) to schedule a UE to transmit or receive user data traffic (e.g., PDSCH or PUSCH) using a second carrier 804 of a second cell (scheduled cell) with a higher SCS. The first carrier 802 may be time-divided into a plurality of first slots 806 and the second carrier may be time-divided into a plurality of second slots 808. In some examples, the first carrier may have a SCS of 15 kHz, and the second carrier may have a SCS higher than 15 kHz (e.g., 120 kHz or higher). Thus, the second carrier 804 may include a number of second slots 808 that may be transmitted within the time duration of a single first slot 806 of the first carrier 802.

In a PDCCH region 810 of a first slot (e.g., slot0) 806 of the first carrier 802, the scheduling entity may transmit multiple unicast DCIs (scheduling information) for several second slots 808 (e.g., slot2 to slot7 of a first subframe and slot0 and slot1 of a second subframe) of the scheduled cell. The UE needs to decode these DCIs in time in order to transmit PUSCH or receive PDSCH data on the second carrier 804 while meeting the applicable PDCCH-to-PDSCH or PDCCH-to-PUSCH delay requirement.

Aspects of the present disclosure improve the decoding timeline of scheduling information (e.g., DCIs) for cross-carrier scheduling involving a lower SCS cell scheduling a higher SCS cell. In one aspect of the disclosure, the scheduling entity may associate a PDCCH candidate with the slot index and/or symbol index of the PDSCH/PUSCH on the scheduled carrier. As such, before a UE processes the PDCCH, the UE can determine whether a PDCCH candidate is associated with an early PDSCH/PUSCH slot or with a later PDSCH/PUSCH slot.

Figure 9:
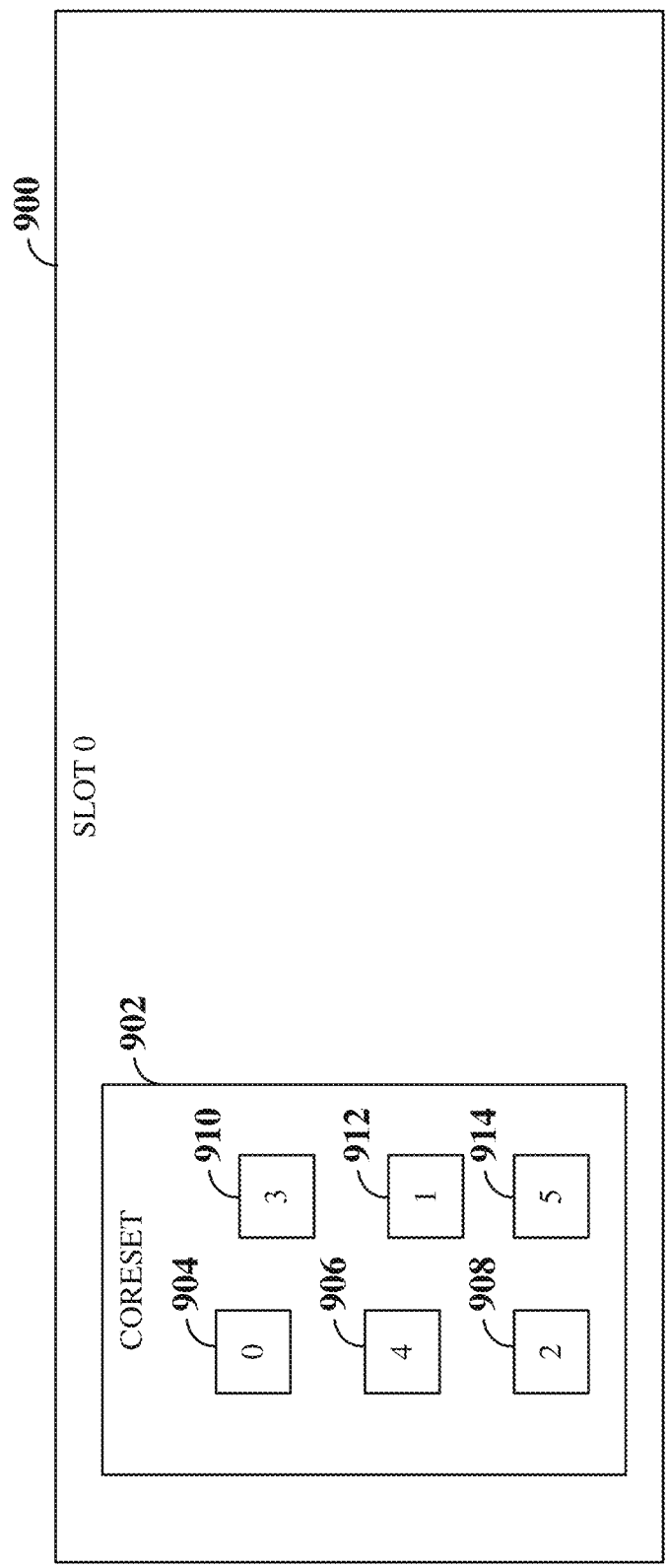
FIG. 9 is a diagram conceptually illustrating first exemplary control resources in a slot of a scheduling cell according to some aspects.

FIG. 9 is a diagram conceptually illustrating control resources in a slot 900 of a scheduling cell. For example, the slot 900 may be slot0 806 of the carrier 802 illustrated in FIG. 8. An exemplary CORESET 902 is shown in FIG. 9. In other examples, the slot 900 may have multiple CORESETs defined. The CORESET 902 includes a number of PDCCH candidates where the UE may find the DCIs for a scheduled cell. Each of the PDCCH candidates may be associated with the slot index and/or starting symbol index of the corresponding PDSCH/PUSCH on the scheduled carrier. Therefore, before the UE processes the PDCCH, the UE can determine whether a PDCCH candidate is associated with an early PDSCH/PUSCH slot or with a later PDSCH/PUSCH slot based on the association. In the example illustrated in FIG. 9, a first PDCCH candidate 904 is associated with slot0 of the scheduled carrier, a second PDCCH candidate 906 is associated with slot4 of the scheduled carrier, a third PDCCH candidate 908 is associated with slot2 of the scheduled carrier, a fourth PDCCH candidate 910 is associated with slot3 of the scheduled carrier, a fifth PDCCH candidate 912 is associated with slot1 of the scheduled carrier, and a sixth PDCCH candidate 914 is associated with slot5 of the scheduled carrier. In some examples, the slot index may be a relative PDSCH slot with respect to the PDCCH slot. In some examples, the slot index may be a relative PDSCH slot with respect to a frame or subframe including the PDCCH slot. In other examples, other associations between the PDCCH candidates and the slot index/starting symbol index of the PDSCH/PUSCH may be used.

Figure 10:
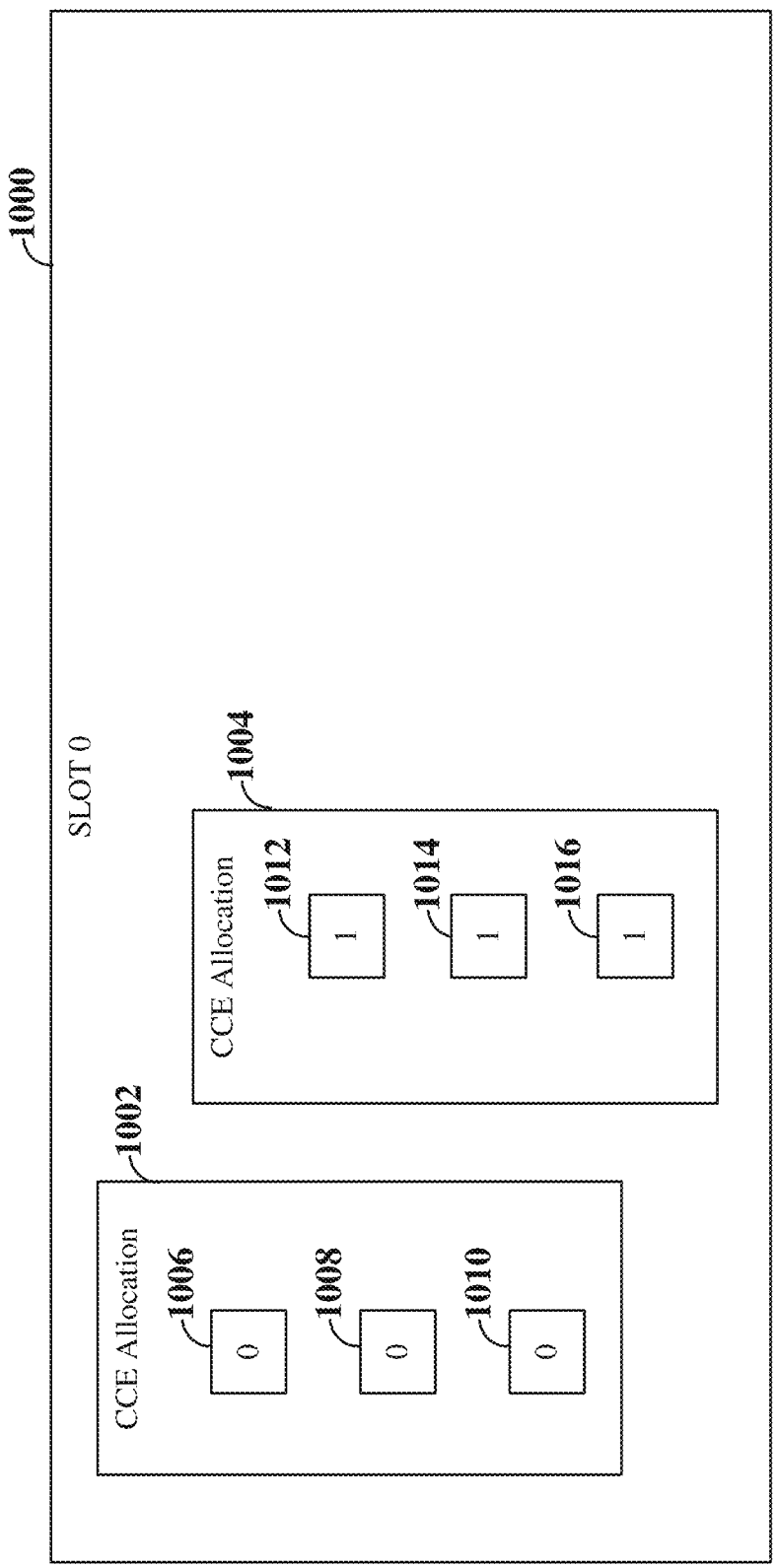
FIG. 10 is a diagram conceptually illustrating second exemplary control resources in a slot of a scheduling cell according to some aspects.

FIG. 10 is a diagram conceptually illustrating control resources in a slot 1000 of a scheduling cell according to some aspects. For example, the slot 1000 may be slot0 806 of the first carrier 802 illustrated in FIG. 8. Two exemplary CCE allocations (CCE allocation 1002 and CCE allocation 1004) are shown in FIG. 10. In other examples, the slot 1000 may have other CCE configurations. The CCE allocations 1002 and 1004 may belong to the same CORESET or different CORESETs. The scheduling entity may use each CCE allocation to carry a number of PDCCH candidates where the UE may find the DCIs for a scheduled cell. In one aspect of the disclosure, the CCE allocation of a PDCCH candidate may depend on the slot index of the scheduled PDSCH/PUSCH, in addition to an existing dependency on the PDCCH candidate and cell index. In other words, the association is between the CCE allocation of a PDCCH candidate and the slot (and/or symbol) index. In one example, a first CCE allocation 1002 is associated with slot0, and a second CCE allocation 1004 is associated with slot1. The first CCE allocation 1002 may include a first PDCCH candidate 1006, a second PDCCH candidate 1008, and a third PDCCH candidate 1010, where the UE may find the DCI for a PDSCH/PUSCH in slot0. The second CCE allocation 1004 may include a fourth PDCCH candidate 1012, a fifth PDCCH candidate 1014, and a sixth PDCCH candidate 1016, wherein the UE may find the DCI for a PDSCH/PUSCH in slot1. In some examples, the slot index may be a relative PDSCH/PUSCH slot with respect to the PDCCH slot. In some examples, the slot index may be a relative PDSCH/PUSCH slot with respect to a frame or subframe including the PDCCH slot.

In some aspects of disclosure, the scheduling entity (e.g., base station) may use radio resource control (RRC) or semi-static signaling to configure the association between control resources (e.g., a CCE allocation or PDCCH candidate) in a scheduling cell and the slot/symbol index of a PDSCH/PUSCH transmission in a scheduled cell. In some aspects of the disclosure, the scheduling entity may signal the association using MAC control element (CE). In some aspects of the disclosure, the scheduling entity may dynamically signal the association using DCI. In some aspects of the disclosure, the association may be specified in the standards defining the network. For example, the standards may provide an equation for determining the CCE allocation for a PDCCH candidate depending on the slot and/or symbol index of scheduled PDSCH/PUSCH.

Figure 11:
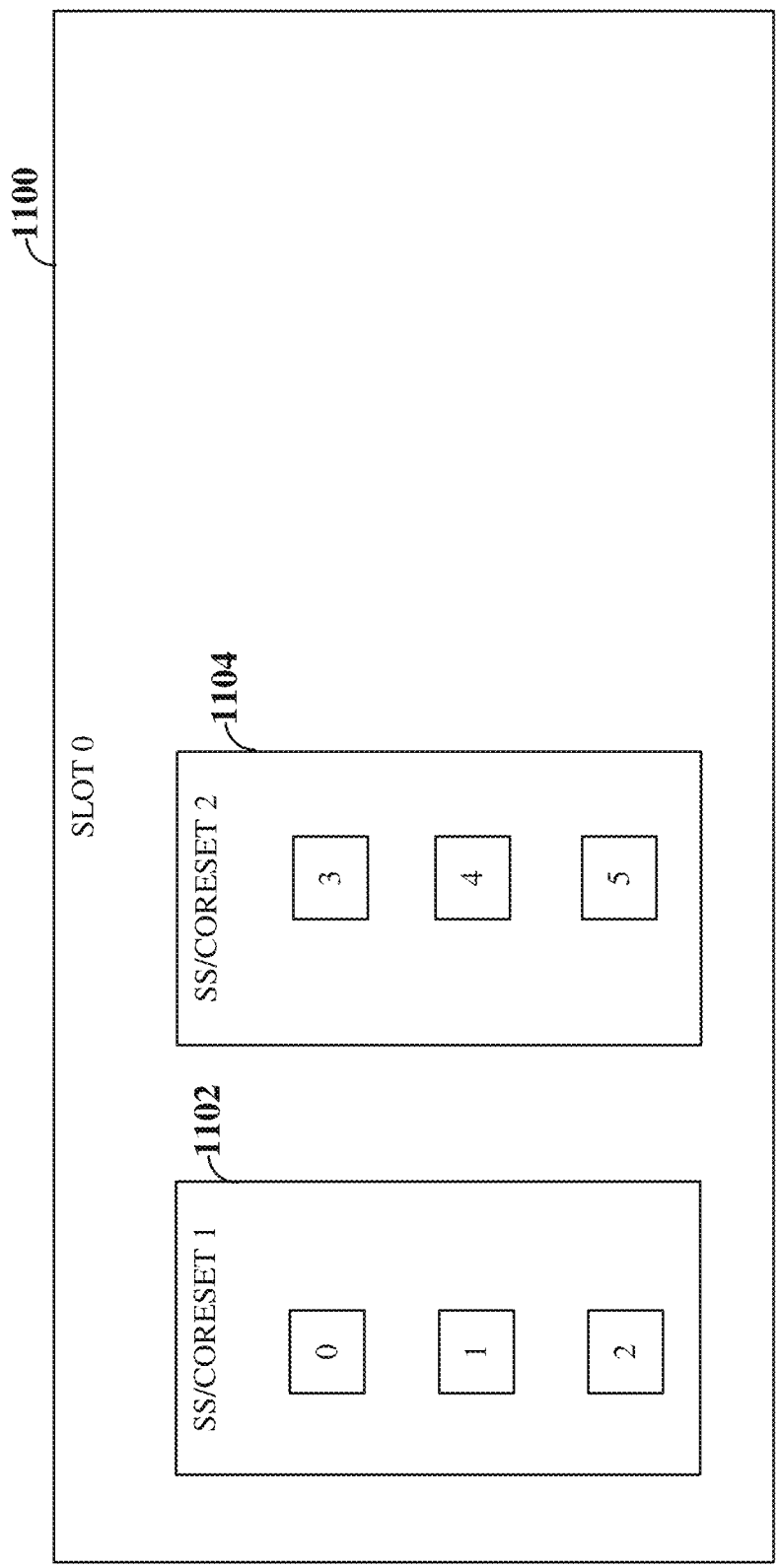
FIG. 11 is a diagram conceptually illustrating third exemplary control resources in a slot in a scheduling cell according to some aspects.

FIG. 11 is a diagram conceptually illustrating control resources in a slot 1100 of a scheduling cell according to some aspects. For example, the slot 1100 may be slot0 806 of the first carrier 802 illustrated in FIG. 8. The scheduling entity may configure multiple search spaces (SS) and/or CORESETs in a slot. Two exemplary SSs or CORESETs of a scheduling cell are illustrated in FIG. 11. Each SS/CORESET provides the scheduling information for a corresponding PDSCH/PUSCH of a scheduled cell. In one example, a first SS/CORESET 1102 is associated with a first set of slots, and a second SS/CORESET 1104 is associated with a second set of slots that are later than the first set of slots. For example, the first SS/CORESET 1102 is associated with slots 0, 1, and 2, and the second SS/CORESET 1104 is associated with slots 3, 4, and 5. The UE can determine the relative timings of the scheduled slots by the SS/CORESETs allocated to the slots.

In one example, a scheduling entity may configure eight PDCCH candidates in one search space set. For example, in a search space set occasion (e.g., within a control/PDCCH region of a single slot), a PDCCH candidate 0 carries a DCI for slot0, a PDCCH candidate 1 carries a DCI for slot1, a PDCCH candidate 2 carries a DCI for slot2, a PDCCH candidate 3 carries a DCI for slot3, a PDCCH candidate 4 carries a DCI for slot4, a PDCCH candidate 5 carries a DCI for slot5, a PDCCH candidate 6 carries a DCI for slot6, and a PDCCH candidate 7 carries a DCI for slot7.

In one example, a scheduling entity may configure four PDCCH candidates in one search space set. In a first search space set occasion, a PDCCH candidate 0 carries a DCI for slot0, a PDCCH candidate 1 carries a DCI for slot1, a PDCCH candidate 2 carries a DCI for slot2, and a PDCCH candidate 3 carries a DCI for slot3. In a second search space set occasion, a PDCCH candidate 4 carries a DCI for slot4, a PDCCH candidate 5 carries a DCI for slot5, a PDCCH candidate 6 carries a DCI for sloth, and a PDCCH candidate 7 carries a DCI for slot7.

In one example, a scheduling entity may configure eight PDCCH candidates in one search space set. In a search space set occasion, PDCCH candidates 0 and 1 carry a DCI for slot0, PDCCH candidates 2 and 3 carry a DCI for slot1, PDCCH candidates 4 and 5 carry a DCI for slot2, and PDCCH candidates 6 and 7 carry a DCI for slot3.

In one example, a scheduling entity may configure eight PDCCH candidates in one search space set. In a search space set occasion, a first set of PDCCH candidates (e.g., 0 through 3) carry a DCI for slot0, a second set of PDCCH candidates (e.g., 2 through 5) carry a DCI for slot1, a third set of PDCCH candidates (e.g., 4 through 7) carry a DCI for slot2, and a fourth set of PDCCH candidates (e.g., 0, 1, 6, and 7) carry a DCI for slot3.

When a scheduling entity (e.g., a base station) transmits scheduling information (e.g., PDCCH/DCI) to schedule a PDSCH/PUSCH across carriers, a scheduled entity (e.g., UE) needs sufficient time to process the DCI. The 5G NR standards may specify a minimum PDCCH-to-PDSCH delay and minimum PDCCH-to-PUSCH delay for cross-carrier scheduling. The minimum PDCCH-to-PDSCH delay ($\Delta_{PDCCH\text{-}to\text{-}PDSCH}$) refers to the minimum time gap between the end of a PDCCH and the beginning of a PDSCH. The minimum PDCCH-to-PUSCH delay ($\Delta_{PDCCH\text{-}to\text{-}PUSCH}$) refers to the minimum time gap between the end of a PDCCH and the beginning of a PUSCH. The scheduling entity needs to make sure that a scheduled PDSCH/PUSCH does not violate the minimum $\Delta_{PDCCH\text{-}to\text{-}PDSCH}$ and $\Delta_{PDCCH\text{-}to\text{-}PUSCH}$. That is, the scheduling entity should not schedule a PDSCH/PUSCH that begins sooner than the minimum $\Delta_{PDCCH\text{-}to\text{-}PDSCH}/\Delta_{PDCCH\text{-}to\text{-}PUSCH}$.

In some aspects of the disclosure, the UE may take minimum $\Delta_{PDCCH\text{-}to\text{-}PDSCH}/\Delta_{PDCCH\text{-}to\text{-}PUSCH}$ into consideration when the UE decodes the cross-carrier PDCCH as described above in relation to FIGS. 8-11. For example, the UE may determine the earliest slot on the scheduled carrier that can meet the minimum $\Delta_{PDCCH\text{-}to\text{-}PDSCH}/\Delta_{PDCCH\text{-}to\text{-}PUSCH}$. Then, the UE may start PDCCH decoding from the PDCCH candidates associated with the earliest PDSCH/PUSCH slot that is allowed by the minimum $\Delta_{PDCCH\text{-}to\text{-}PDSCH}/\Delta_{PDCCH\text{-}to\text{-}PUSCH}$, that may be specified in the unit of symbols. If a scheduled PDSCH/PUSCH does not meet the minimum $\Delta_{PDCCH\text{-}to\text{-}PDSCH}/\Delta_{PDCCH\text{-}to\text{-}PUSCH}$, the UE may ignore the corresponding DCI.

In some aspects of the disclosure, the scheduling entity may configure the UE to use a minimum DL-grant-to-DL-data (PDSCH) timing (K0) and a minimum UL-grant-to-UL-data (PUSCH) timing (K2) for scheduling PDSCH/PUSCH on a carrier. For example, K0/K2 may be specified in the unit of slots. In some examples, the configured minimum K0/K2 may be greater in time duration than the minimum $\Delta_{PDCCH\text{-}to\text{-}PDSCH}/\Delta_{PDCCH\text{-}to\text{-}PUSCH}$. When a minimum K0/K2 is configured, the UE decodes the PDCCH starting from PDCCH candidate(s) that are associated with the earliest scheduled slot based on the configured minimum K0/K2. In some examples, the scheduling entity may transmit an RRC message to configure the minimum K0/K2.

Figure 12:
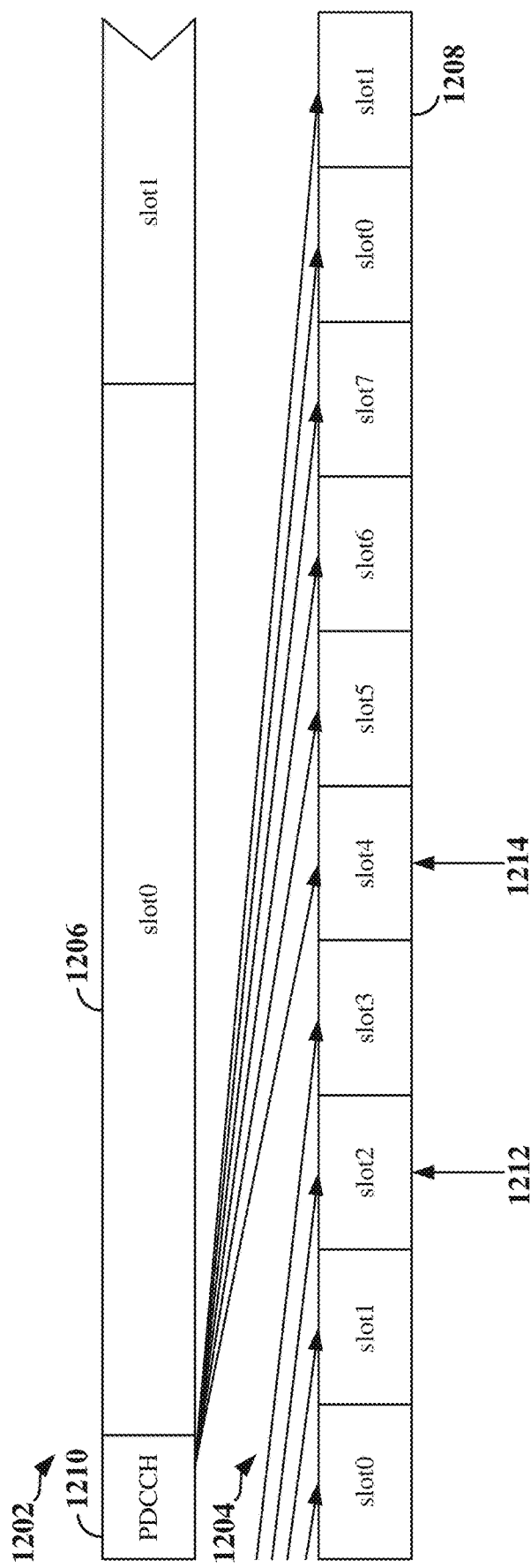
FIG. 12 is a diagram conceptually illustrating exemplary minimum delays between a scheduling cell and a scheduled cell according to some aspects.

FIG. 12 is a diagram conceptually illustrating exemplary minimum delays between a scheduling cell and a scheduled cell according to some aspects. Similar to the example shown in FIG. 8, a scheduling entity (e.g., base station) may use a first carrier 1202 of a first cell (scheduling cell) with a lower subcarrier spacing (SCS) to schedule a UE to transmit or receive user data traffic (e.g., PDSCH or PUSCH) using a second carrier 1204 of a second cell (scheduled cell) with a higher SCS. The first carrier 1202 may be time-divided into a plurality of first slots 1206 and the second carrier may be time-divided into a plurality of second slots 1208. In addition, the first carrier may have a SCS of 15 kHz, and the second carrier may have a SCS higher than 15 kHz (e.g., 120 kHz or higher). Thus, the second carrier 1204 may include a number of second slots 1208 that may be transmitted within the time duration of a single first slot 1206 of the first carrier 1202.

In the example illustrated in FIG. 12, a minimum K0/K2 1214 is configured to be in slot4 of the second slots 1208 that is later than a minimum $\Delta_{PDCCH\text{-}to\text{-}PDSCH}/\Delta_{PDCCH}$-to-PUSCH 1212 configured for slot2 of the second slots 1208. In that case, the scheduling entity should not schedule PDSCH/PUSCH in a slot that is earlier than K0/K2 1214. In addition, the UE may ignore a DCI that schedules a PDSCH/PUSCH in a slot earlier than K0/K2 1214. As a result, in a PDCCH region 1210 of a first slot (e.g., slot0) 1206 of the first carrier 1202, the scheduling entity may transmit multiple unicast DCIs (scheduling information) for several second slots 1208 of the scheduled cell that are not earlier than K0/K2 1214 (e.g., slot4 to slot7 of a first subframe and slot0 and slot1 of a second subframe).

In some aspects of the disclosure, a UE may be configured with a time-domain resource allocation (TDRA) table for PDSCH and PUSCH, respectively, in a scheduled cell. Each row in the TDRA table may contain a K0/K2 value. When a scheduling entity schedules a PDSCH/PUSCH, the scheduling entity transmits control information (e.g., DCI/PDCCH) to indicate the row index of the TDRA table. In some examples, the scheduling entity may transmit an RRC message to indicate the row index. Based on the index, a scheduled entity (e.g., UE) can determine the K0/K2 value from the table. In one example, when the minimum K0/K2 is configured, the UE may treat any TDRA entries with a K0/K2 value smaller than the configured minimum K0/K2 as invalid. In that case, the UE may ignore the scheduling information for the invalid slot. In another example, the UE may treat the K0/K2 value in the TDRA table as a delta value, which will be added to the configured minimum K0/K2 to determine the actual or effective K0/K2. In one example, if the minimum configured K0 is 4 slots, and in an exemplary TDRA row in the TDRA table, the K0 value is 2 slots, the UE determines that the PDSCH/PUSCH is scheduled in slot6 as illustrated in FIG. 12.

Figure 13:
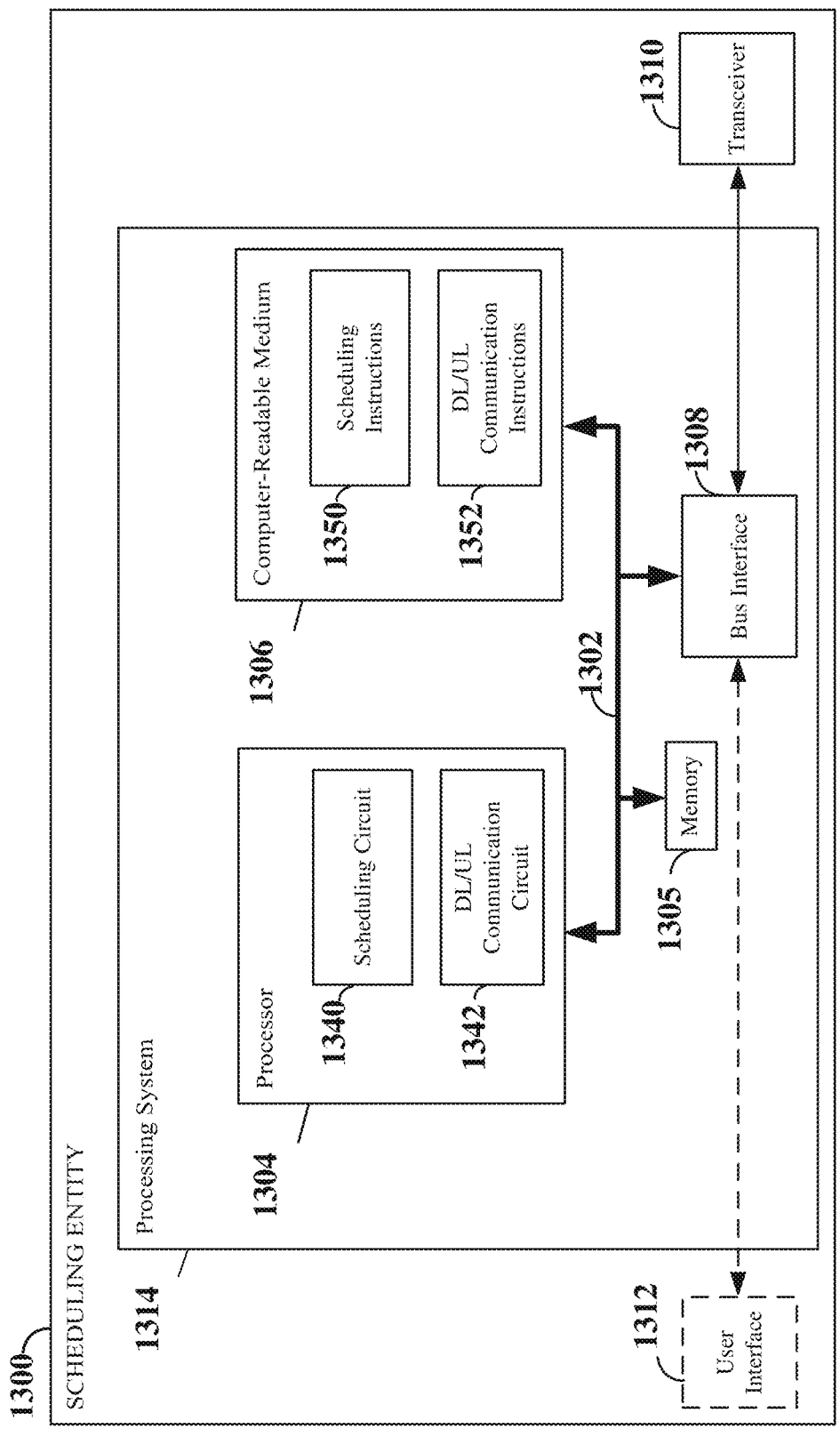
FIG. 13 is a block diagram conceptually illustrating an example of a hardware implementation for a scheduling entity according to some aspects.

FIG. 13 is a block diagram illustrating an example of a hardware implementation for a scheduling entity 1300 employing a processing system 1314. For example, the scheduling entity 1300 may be a base station as illustrated in any one or more of FIGS. 1 and/or 2.

The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated in FIGS. 8-12, 14, and 15.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and may be omitted in some examples, such as a base station.

In some aspects of the disclosure, the processor 1304 may include circuitry configured for various functions, including, for example, cross-carrier scheduling in wireless communication. For example, the circuitry may be configured to implement one or more of the functions described in relation to FIGS. 8-12, 14, and 15. For example, the processor 1304 may include a scheduling circuit 1340 and a DL/UL communication circuit 1342. The scheduling circuit 1340 may be configured to perform various functions for cross-carrier scheduling. For example, the scheduling circuit 1340 may be configured to determine scheduling information to configure a scheduled entity (e.g., UE) to transmit or receive data. The scheduling information may be PDCCH/DCI to be transmitted on a first carrier for scheduling one or more PDSCH/PUSCH transmission on a second carrier. The first carrier and the second carrier may have different numerologies.

The DL/UL communication circuit 1342 may be configured to perform various functions to transmit and receive data via the transceiver 1310 using the first carrier and/or the second carrier. In one example, the DL/UL communication circuit 1342 may be configured to transmit the scheduling information to a UE using the first carrier of a first numerology, such that the UE is configured to transmit or receive data using the second carrier of a second numerology. The DL/UL communication circuit 1342 may be configured to transmit the scheduling information using control resources allocated, for example, by the scheduling circuit 1340, based on slot indexes of a plurality of PDSCH/PUSCH slots on the second carrier configured for transmitting or receiving the data on the second carrier. The control resources may include, for example, search space, CORESETs, CCEs, and PDCCH candidates.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include software configured for various functions, including, for example, cross-carrier scheduling. For example, the software may be configured to implement one or more of the functions described above in relation to FIGS. 8-12, 14, and 15. For example, software may include scheduling instructions 1350 and DL/UL communication instructions 1352.

The scheduling instructions 1350 may configure the scheduling entity 1300 to preform various functions for cross-carrier scheduling. For example, the scheduling instructions 1350 may configure the scheduling entity 1300 to determine scheduling information to configure a scheduled entity (e.g., UE) to transmit or receive data in PDSCH/PUSCH slots. The scheduling information may be PDCCH/DCI to be transmitted on a first carrier for scheduling one or more PDSCH/PUSCH transmissions on a second carrier. The first carrier and the second carrier may have different numerologies. The scheduling instructions 1350 may further be executable by the scheduling circuit 1340.

The DL/UL communication instructions 1352 may configure the scheduling entity to perform various functions to transmit and receive data via the transceiver 1310 using the first carrier and/or the second carrier. In one example, the DL/UL communication instructions 1352 may configure the scheduling entity 1300 to transmit the scheduling information to a UE using the first carrier of a first numerology, such that the UE is configured to transmit or receive data using the second carrier of a second numerology. The DL/UL communication instructions 1352 may configure the scheduling entity to transmit the scheduling information using control resources allocated, for example, by the scheduling circuit 1340, based on slot indexes of a plurality of slots on the second carrier configured for transmitting or receiving the data on the second carrier. The control resources may include, for example, search space, CORESETs, CCEs, and PDCCH candidates. The DL/UL communication instructions 1352 may further be executable by the DL/UL communication circuit 1342.

Figure 14:
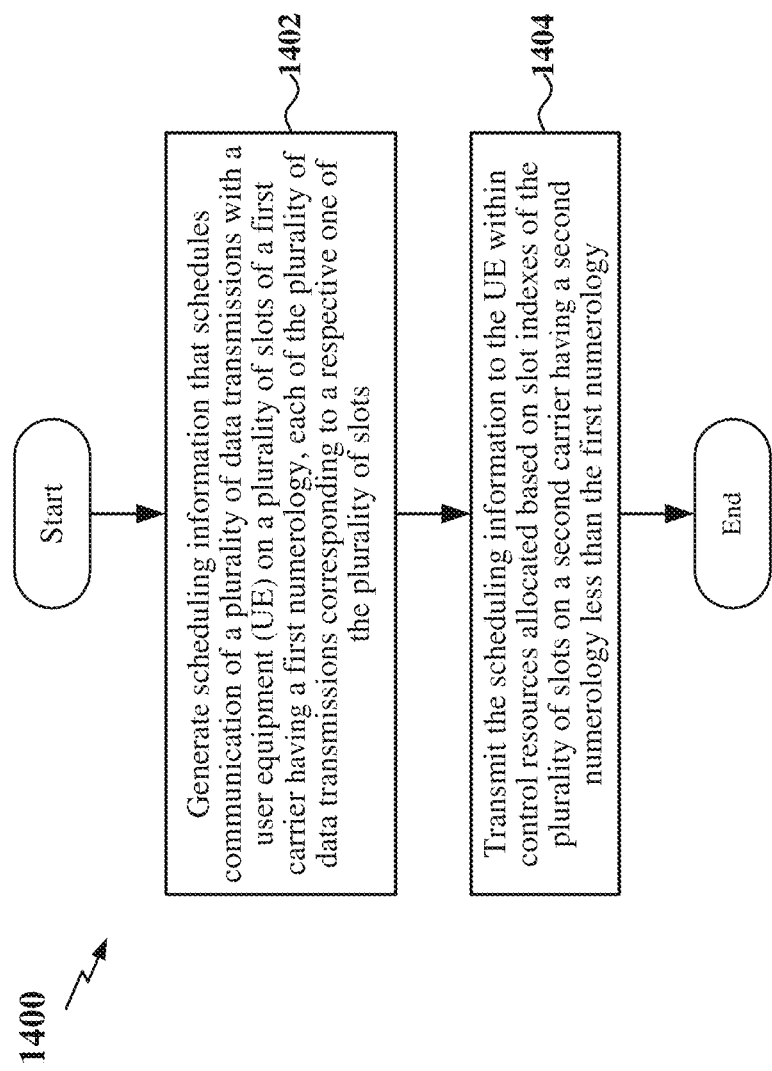
FIG. 14 is a flow chart illustrating an exemplary process for cross-carrier scheduling according to some aspects.

FIG. 14 is a flow chart illustrating an exemplary process 1400 for cross-carrier scheduling in accordance with some aspects. As described below, some or all illustrated features may be omitted in a particular implementation within the scope of the present disclosure, and some illustrated features may not be required for implementation of all examples. In some examples, the process 1400 may be carried out by the scheduling entity 1300 illustrated in FIG. 13. In some examples, the process 1400 may be carried out by any suitable apparatus or means for carrying out the functions or algorithms described below.

At block 1402, the scheduling entity may generate scheduling information that schedules communication of a plurality of data transmissions with a user equipment (UE) on a plurality of slots of a first carrier having a first numerology, each of the plurality of data transmissions corresponding to a respective one of the plurality of slots. For example, the scheduling circuit 1340 shown and described above in connection with FIG. 13 may provide a means to generate the scheduling information (e.g., PDCCH/DCI) that schedules communication of a plurality of PDSCHs and/or PUSCHs for the UE.

At block 1404, the scheduling entity may transmit the scheduling information to the UE within control resources allocated based on slot indexes of the plurality of slots on a second carrier having a second numerology less than the first numerology. In one example, the first carrier and second carrier may be the first carrier 802 and second carrier 804, respectively, which are described above in relation to FIG. 8.

In some examples, the control resources include a plurality of physical downlink control channel (PDCCH) candidates that are respectively associated with the slot indexes of the plurality of slots. In some examples, the plurality of PDCCH candidates include a first PDCCH candidate associated with a first slot of the plurality of slots, and a second PDCCH candidate associated with a second slot of the plurality of slots, and the first slot is earlier in time than the second slot. In some examples, each of the slot indexes is configured to indicate a respective slot of the plurality of slots including a physical downlink shared channel (PDSCH) or a physical uplink shared channel (PUSCH), relative to an initial slot on the second carrier including the plurality of PDCCH candidates. In other examples, each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

In some examples, the control resources include a plurality of physical downlink control channel (PDCCH) candidates, and a control channel element (CCE) allocation of the PDCCH candidates is dependent on the slot indexes of the plurality of slots. In some examples, the scheduling entity may transmit a first part of the scheduling information using a first set of the control resources that are associated with a first slot of the plurality of slots, and transmit a second part of the scheduling information using a second set of the control resources that are associated with a second slot of the plurality of slots. In some examples, each of the first set of the control resources and the second set of the control resources includes a search space or a control resource set.

In some examples, the scheduling entity may further transmit control information to indicate the association between the control resources and the plurality of slots using at least one of radio resource control signaling, a medium access control (MAC) control element (MAC-CE), or downlink control information. For example, the DL/UL communication circuit 1342 and the transceiver 1310 shown and described above in connection with FIG. 13 may provide a means to transmit the scheduling information to the UE.

In one example, the scheduling information may be one or more DCIs each including a downlink (DL) grant for a PDSCH and/or an uplink (UL) grant for a PUSCH. In one example, the control resources may be time-frequency resources allocated to a PDCCH candidate based on a slot index and/or symbol index of the scheduled PDSCH/PUSCH. In one example, the control resources may be a CCE allocation of a PDCCH candidate configured based on a slot index of the scheduled PDSCH/PUSCH. In one example, the control resources may be search spaces or CORESETs, and the search spaces/CORESETs may be respectively associated with different slots. For example, a first search space/CORESET may be associated with one or more first slots, and a second search space/CORESET may be associated with one or more second slots.

Figure 15:
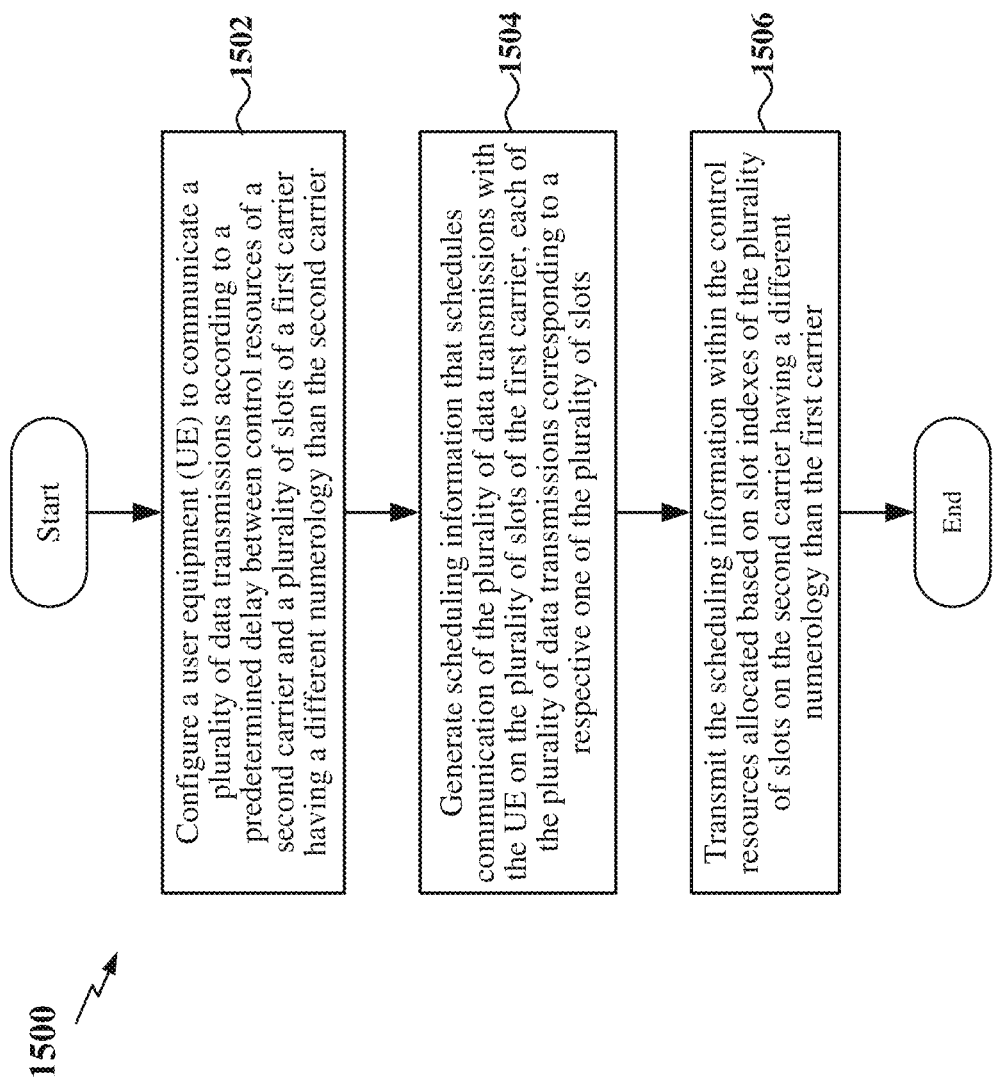
FIG. 15 is a flow chart illustrating an exemplary process for cross-carrier scheduling according to some aspects

FIG. 15 is a flow chart illustrating an exemplary process 1500 for cross-carrier scheduling in accordance with some aspects. As described below, some or all illustrated features may be omitted in a particular implementation within the scope of the present disclosure, and some illustrated features may not be required for implementation of all examples. In some examples, the process 1500 may be carried out by the scheduling entity 1300 illustrated in FIG. 13. In some examples, the process 1500 may be carried out by any suitable apparatus or means for carrying out the functions or algorithms described below.

At block 1502, the scheduling entity may configure a user equipment (UE) to communicate a plurality of data transmissions according to a predetermined minimum delay between control resources of a second carrier scheduling the plurality of data transmissions and a plurality of slots of a first carrier having a different numerology than the second carrier on which the plurality of data transmissions are to be communicated. In some examples, the second carrier may have a numerology that is less than the first carrier. In some examples, the scheduling entity may configure the UE by transmitting the predetermined minimum delay to the UE in a radio resource control message. In some examples, the scheduling entity may configure the UE by transmitting downlink control information including a table index identifying the predetermined minimum delay in a table including a plurality of time delays. For example, the DL/UL communication circuit 1342 and the transceiver 1310 shown and described above in connection with FIG. 13 may provide a means to configure the UE.

At block 1504, the scheduling entity may generate scheduling information that schedules communication of the plurality of data transmissions with the UE on the plurality of slots of the first carrier, each of the plurality of data transmissions corresponding to a respective one of the plurality of slots. For example, the scheduling circuit 1340 shown and described above in connection with FIG. 13 may provide a means to generate the scheduling information (e.g., PDCCH/DCI) that schedules communication of a plurality of PDSCHs and/or PUSCHs for the UE.

At block 1506, the scheduling entity may transmit the scheduling information to the UE within control resources allocated based on slot indexes of the plurality of slots on the second carrier. In one example, the first carrier and second carrier may be the first carrier 802 and second carrier 804, respectively, which are described above in relation to FIG. 8.

In some examples, the control resources include a plurality of physical downlink control channel (PDCCH) candidates that are respectively associated with the slot indexes of the plurality of slots. In some examples, the plurality of PDCCH candidates include a first PDCCH candidate associated with a first slot of the plurality of slots, and a second PDCCH candidate associated with a second slot of the plurality of slots, and the first slot is earlier in time than the second slot. In some examples, each of the slot indexes is configured to indicate a respective slot of the plurality of slots including a physical downlink shared channel (PDSCH) or a physical uplink shared channel (PUSCH), relative to an initial slot on the second carrier including the plurality of PDCCH candidates. In other examples, each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

In some examples, the control resources include a plurality of physical downlink control channel (PDCCH) candidates, and a control channel element (CCE) allocation of the PDCCH candidates is dependent on the slot indexes of the plurality of slots. In some examples, the scheduling entity may transmit a first part of the scheduling information using a first set of the control resources that are associated with a first slot of the plurality of slots, and transmit a second part of the scheduling information using a second set of the control resources that are associated with a second slot of the plurality of slots. In some examples, each of the first set of the control resources and the second set of the control resources includes a search space or a control resource set.

In some examples, the scheduling entity may further transmit control information to indicate the association between the control resources and the plurality of slots using at least one of radio resource control signaling, a medium access control (MAC) control element (MAC-CE), or downlink control information. For example, the DL/UL communication circuit 1342 and the transceiver 1310 shown and described above in connection with FIG. 13 may provide a means to transmit the scheduling information to the UE.

Figure 16:
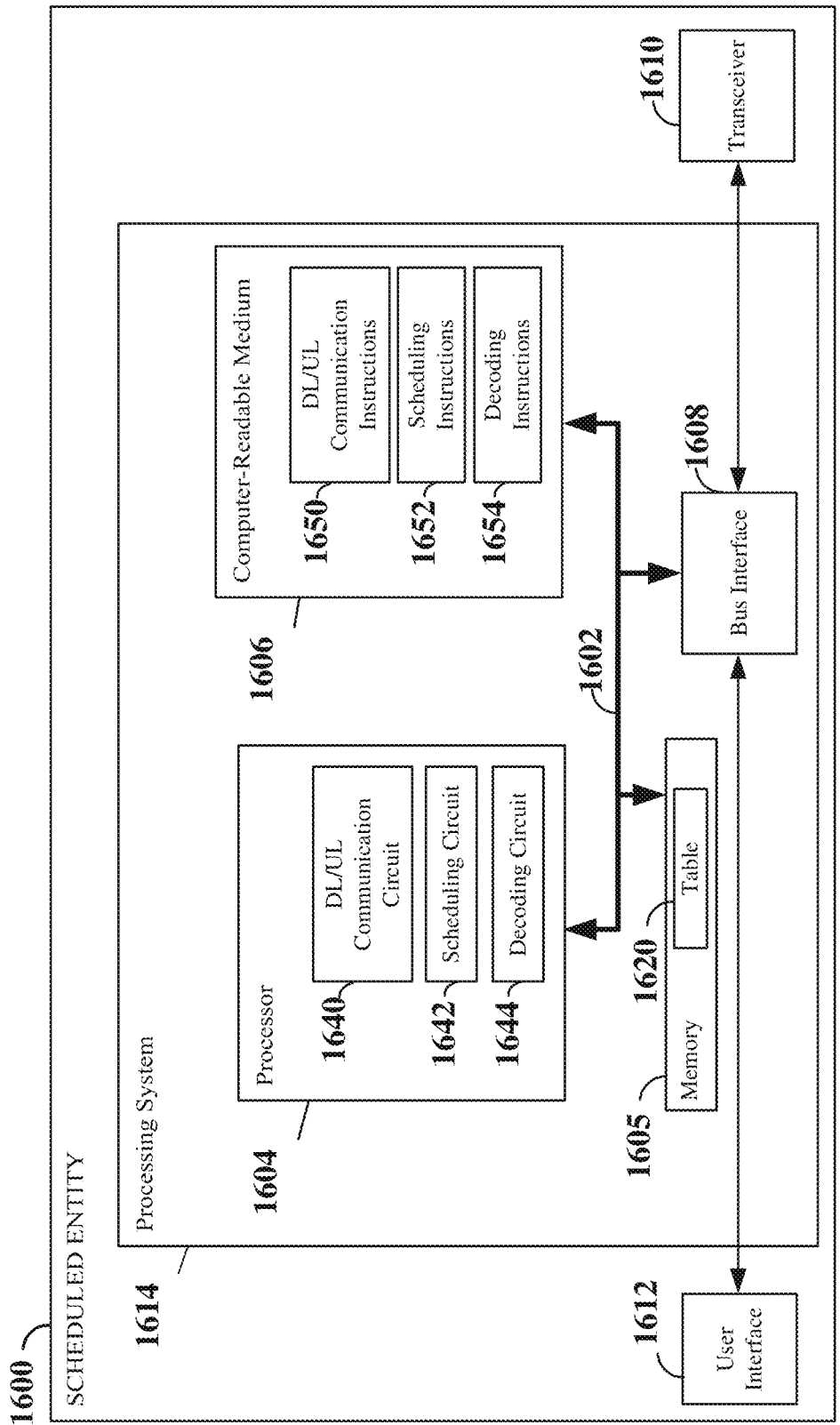
FIG. 16 is a block diagram conceptually illustrating an example of a hardware implementation for a scheduled entity according to some aspects.

FIG. 16 is a conceptual diagram illustrating an example of a hardware implementation for an exemplary scheduled entity 1600 employing a processing system 1614. In accordance with various aspects of the disclosure, an element, or any portion of an element, or any combination of elements may be implemented with a processing system 1614 that includes one or more processors 1604. For example, the scheduled entity 1600 may be a user equipment (UE) as illustrated in any one or more of FIGS. 1 and/or 2.

The processing system 1614 may be substantially the same as the processing system 1314 illustrated in FIG. 13, including a bus interface 1608, a bus 1602, memory 1605, a processor 1604, and a computer-readable medium 1606. Furthermore, the scheduled entity 1600 may include a user interface 1612 and a transceiver 1610 substantially similar to those described above in FIG. 13. That is, the processor 1604, as utilized in a scheduled entity 1600, may be used to implement any one or more of the processes and methods described and illustrated in FIGS. 8-12, 17 and 18.

In some aspects of the disclosure, the processor 1604 may include circuitry configured for various functions, including, for example, cross-carrier scheduling. For example, the circuitry may be configured to implement one or more of the functions described in relation to FIGS. 8-12, 17 and 18. For example, the processor 1604 may include a DL/UL communication circuit 1640, a scheduling circuit 1642, and a decoding circuit 1644.

The DL/UL communication circuit 1640 may be configured to perform various functions to transmit and receive data via the transceiver 1610 using a first carrier and/or a second carrier. The first carrier and the second carrier may have different numerologies. In one example, the DL/UL communication circuit 1640 may be configured to receive scheduling information from the scheduling entity (e.g., base station) on the first carrier. The scheduling information may configure the scheduled entity (e.g., UE) to transmit or receive data (e.g., communicate data transmissions) using a plurality of PDSCH/PUSCH slots on the second carrier. For example, the scheduling information may be PDCCH/DCI transmitted on the first carrier for scheduling one or more PDSCH/PUSCH transmissions on the second carrier in the plurality of slots.

The scheduling circuit 1642 may be configured to perform various functions for cross-carrier scheduling. For example, the scheduling circuit 1642 may be configured to determine relative timing positions of the plurality of slots based on an association between the plurality of slots and control resources allocated to the scheduling information. The control resources may include, for example, search space, CORESETs, CCEs, and PDCCH candidates. The scheduling circuit 1642 may further be configured to access a table 1620 (e.g., a time-domain resource allocation (TDRA) table for PDSCH and PUSCH, respectively) for a scheduled cell. Each row in the TDRA table may contain a K0/K2 value. In some examples, the DL/UL communication circuit 1640 may receive an RRC message from the scheduling entity indicating the row index. Based on the index, the scheduling circuit 1642 can determine the K0/K2 value from the table 1620.

The decoding circuit 1644 may be configured to perform various functions for decoding scheduling information. For example, the decoding circuit 1644 may be configured to decode the scheduling information in an order based on the relative timing positions of the plurality of slots that are determined by the scheduling circuit 1642.

In one or more examples, the computer-readable storage medium 1606 may include software configured for various functions, including, for example, cross-carrier scheduling. For example, the software may be configured to implement one or more of the functions described above in relation to FIGS. 8-12, 17, and 18. For example, software may include DL/UL communication instructions 1650, scheduling instructions 1652, and decoding instructions 1654.

The DL/UL communication instructions 1650 may configure the scheduled entity 1600 to perform various functions to transmit and receive data via the transceiver 1610 using a first carrier and/or a second carrier. The first carrier and the second carrier may have different numerologies. In one example, the DL/UL communication instructions 1650 may configure the scheduled entity 1600 to receive scheduling information from the scheduling entity (e.g., base station) on the first carrier. The scheduling information may configure the scheduled entity (e.g., UE) to transmit or receive data (e.g., communicate data transmissions) using a plurality of PDSCH/PUSCH slots on the second carrier. For example, the scheduling information may be PDCCH/DCI transmitted on the first carrier for scheduling one or more PDSCH/PUSCH transmissions on the second carrier in the plurality of slots. The DL/UL communication instructions 1650 may be executable by the DL/UL communication circuit 1640

The scheduling instructions 1652 may configure the scheduled entity 1600 to perform various functions for cross-carrier scheduling. For example, the scheduling instructions 1652 may configure the scheduled entity 1600 to determine relative timing positions of the plurality of slots based on an association between the plurality of slots and control resources allocated to the scheduling information. The control resources may include, for example, search space, CORESETs, CCEs, and PDCCH candidates. The scheduling instructions 1652 may further configure the scheduled entity 1600 to access the table 1620 for a scheduled cell. For example, based on a row index received from the scheduling entity, the scheduling instructions 1652 can configure the scheduled entity 1600 to determine the K0/K2 value from the table 1620. The scheduling instructions 1652 may be executable by the scheduling circuit 1642.

The decoding instructions 1654 may configure the scheduled entity 1600 to perform various functions for decoding scheduling information. For example, the decoding instructions 1654 may configure the scheduled entity 1600 to decode the scheduling information in an order based on the relative timing positions of the plurality of slots that are determined by the scheduling circuit 1642. The decoding instructions 1654 may be executable by the decoding circuit 1644.

Figure 17:
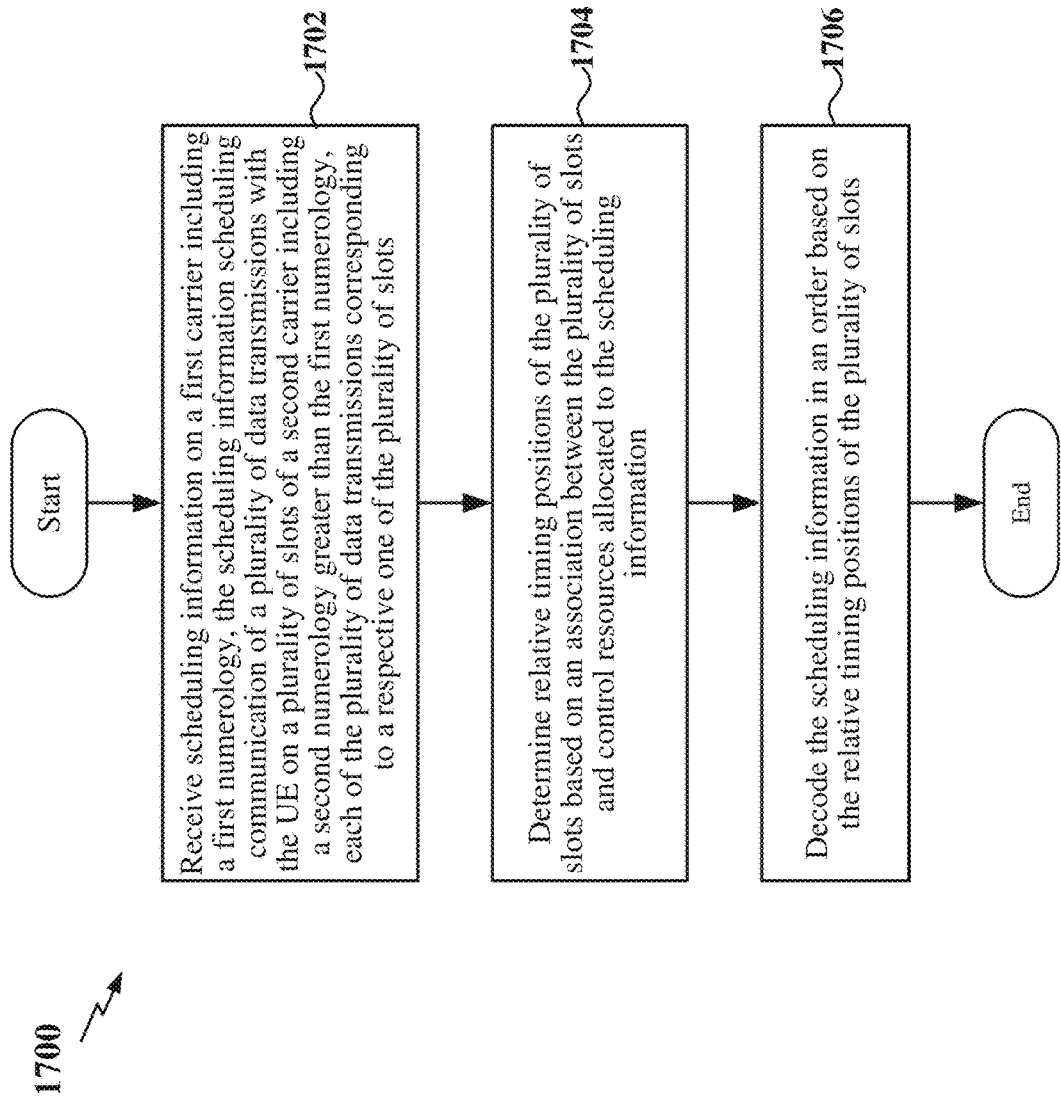
FIG. 17 is a flow chart illustrating an exemplary process for decoding control information used in cross-carrier scheduling according to some aspects.

FIG. 17 is a flow chart illustrating an exemplary process 1700 for decoding control information used in cross-carrier scheduling in accordance with some aspects of the present disclosure. As described below, some or all illustrated features may be omitted in a particular implementation within the scope of the present disclosure, and some illustrated features may not be required for implementation of all examples. In some examples, the process 1700 may be carried out by the scheduled entity 1600 illustrated in FIG. 16. In some examples, the process 1700 may be carried out by any suitable apparatus or means for carrying out the functions or algorithms described below.

At block 1702, the scheduled entity (e.g., UE) receives scheduling information on a first carrier including a first numerology. The scheduling information is configured to schedule the scheduled entity to communicate a plurality of data transmissions using a plurality of slots on a second carrier including a second numerology greater than the first numerology. Each of the plurality of data transmissions may correspond to a respective one of the plurality of slots. In one example, the scheduling information may be included in a PDCCH transmission of the first carrier. In one example, the first carrier and second carrier may be the first carrier 802 and second carrier 804, respectively, which are described above in relation to FIG. 8.

In some examples, the scheduled entity may receive a first part of the scheduling information using a first set of control resources that are associated with a first slot of the plurality of slots and receive a second part of the scheduling information using a second set of the control resources that are associated with a second slot of the plurality of slots. In some examples, each of the first set of the control resources and the second set of the control resources includes a search space or a control resource set. For example, the DL/UL communication circuit 1640 and the transceiver 1610 shown and described above in connection with FIG. 16 may provide a means to receive the scheduling information.

At block 1704, the scheduled entity may determine relative timing positions of the plurality of slots based on an association between the plurality of slots and control resources allocated to the scheduling information. The control resources may include PDCCH candidates, CCEs, search spaces, and CORESETs. In one example, the scheduled entity may determine the relative timing positions of the slots based on the association between a PDCCH candidate and a slot index and/or starting symbol index of the PDSCH/PUSCH on the scheduled carrier. In one example, the scheduled entity 1100 may determine the relative timing positions of the slots based on the association between a CCE allocation of a PDCCH candidate and a slot index on the scheduled carrier. The relative timing positions indicate the time-based order of the plurality of slots including a PDSCH/PUSCH. The plurality of slots may be the same as the slots of the second carrier 804 described above in relation to FIG. 8. For example, slot0 through slot7 of the second carrier 804 occur at different timing positions.

In some examples, the control resources include a plurality of physical downlink control channel (PDCCH) candidates that are respectively associated with slot indexes of the plurality of slots. In some examples, the plurality of PDCCH candidates include a first PDCCH candidate associated with a first slot of the plurality of slots, and a second PDCCH candidate associated with a second slot of the plurality of slots, and the first slot is earlier in time than the second slot. In some examples, each of the slot indexes is configured to indicate a respective slot of the plurality of slots including a physical downlink shared channel (PDSCH) or a physical uplink shared channel (PUSCH), relative to an initial slot on the first carrier including the plurality of PDCCH candidates. In some examples, each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

In some examples, the control resources include a plurality of physical downlink control channel (PDCCH) candidates, and a control channel element (CCE) allocation of the PDCCH candidates is dependent on the slot indexes of the plurality of slots. In some examples, the scheduled entity may further receive control information that indicates the association between the control resources and the plurality of slots using at least one of radio resource control signaling, medium access control (MAC) control element (MAC-CE), or downlink control information. For example, the scheduling circuit 1642 shown and described above in connection with FIG. 16 may provide a means to determine relative timing positions of the plurality of slots.

At block 1706, the scheduled entity may decode the scheduling information in an order based on the relative timing positions of the plurality of slots. For example, the scheduled entity may decode the scheduling information that schedules a plurality of PDSCH and/or PUSCH transmissions in the plurality of slots. Based on the relative timing positions, the scheduled entity prioritizes processing (e.g., decoding) of the scheduling information of a first slot that is earlier than a second slot.

For example, the control resources may include a plurality of PDCCH candidates respectively associated with the slot index and/or symbol index of the scheduled PDSCH/PUSCH. The scheduled entity may decode a first PDCCH candidate associated with a first slot before decoding a second PDCCH candidate associated with a second slot that is later than the first slot. In some examples, a CCE allocation of a PDCCH candidate may depend on the slot index. In that case, the scheduled entity may decode a PDCCH candidate in a first CCE allocation associated with a first slot before decoding a PDCCH candidate in a second CCE allocation associated with a second slot that is later than the first slot. In some examples, a search space (SS) or CORESET may depend on the slot index. In that case, the scheduled entity may decode a PDCCH candidate in a first SS/CORESET associated with a first slot before decoding a PDCCH candidate in a second SS/CORESET associated with a second slot that is later than the first slot. For example, the decoding circuit 1644 shown and described above in connection with FIG. 16 may provide a means to decode the scheduling information.

Figure 18:
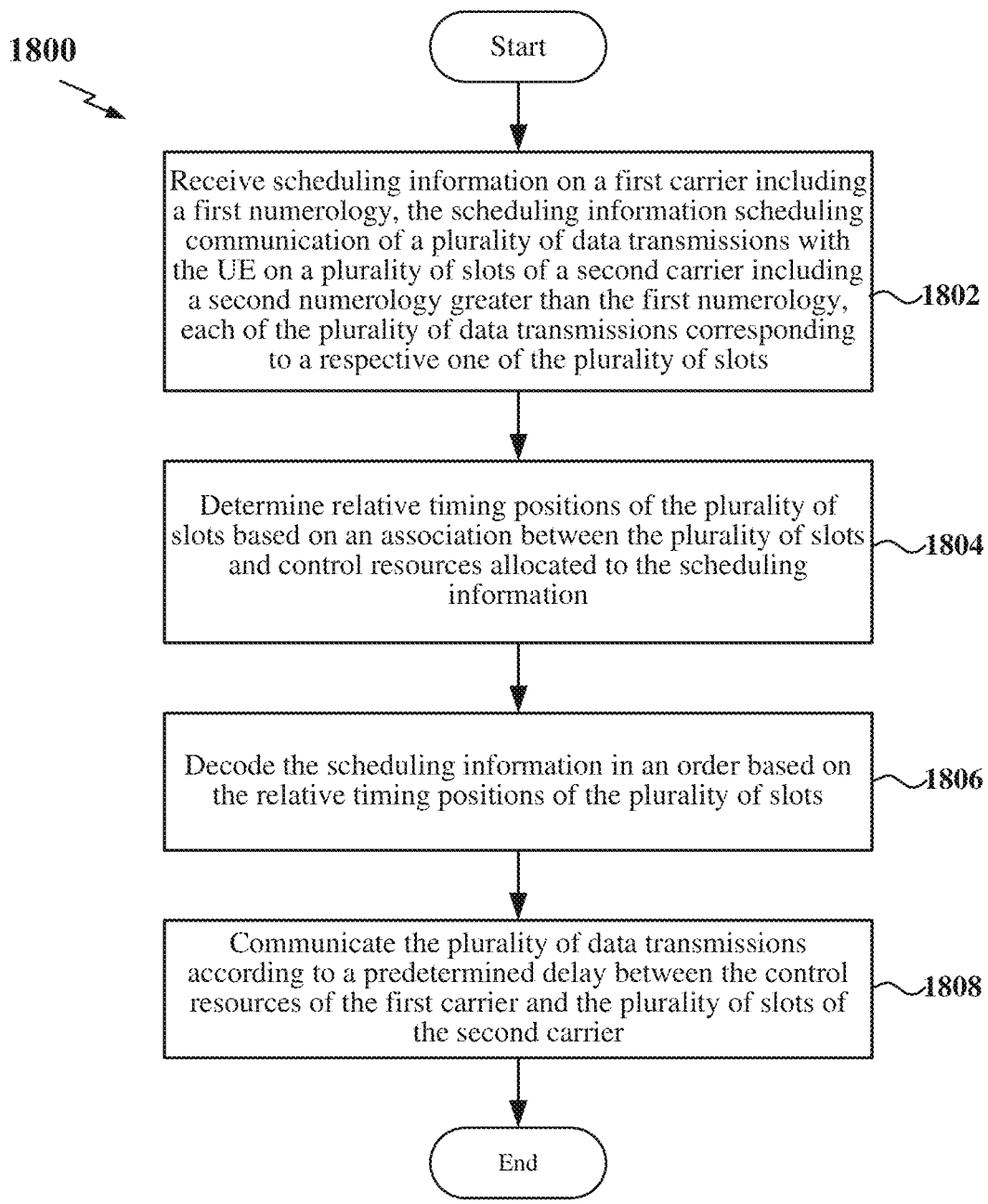
FIG. 18 is a flow chart illustrating an exemplary process for decoding control information used in cross-carrier scheduling according to some aspects.

FIG. 18 is a flow chart illustrating an exemplary process 1800 for decoding control information used in cross-carrier scheduling in accordance with some aspects of the present disclosure. As described below, some or all illustrated features may be omitted in a particular implementation within the scope of the present disclosure, and some illustrated features may not be required for implementation of all examples. In some examples, the process 1800 may be carried out by the scheduled entity 1600 illustrated in FIG. 16. In some examples, the process 1800 may be carried out by any suitable apparatus or means for carrying out the functions or algorithms described below.

At block 1802, the scheduled entity (e.g., UE) receives scheduling information on a first carrier including a first numerology. The scheduling information is configured to schedule the scheduled entity to communicate a plurality of data transmissions using a plurality of slots on a second carrier including a second numerology greater than the first numerology. Each of the plurality of data transmissions may correspond to a respective one of the plurality of slots. In one example, the scheduling information may be included in a PDCCH transmission of the first carrier. In one example, the first carrier and second carrier may be the first carrier 802 and second carrier 804, respectively, which are described above in relation to FIG. 8.

In some examples, the scheduled entity may receive a first part of the scheduling information using a first set of control resources that are associated with a first slot of the plurality of slots and receive a second part of the scheduling information using a second set of the control resources that are associated with a second slot of the plurality of slots. In some examples, each of the first set of the control resources and the second set of the control resources includes a search space or a control resource set. For example, the DL/UL communication circuit 1640 and the transceiver 1610 shown and described above in connection with FIG. 16 may provide a means to receive the scheduling information.

At block 1804, the scheduled entity may determine relative timing positions of the plurality of slots based on an association between the plurality of slots and control resources allocated to the scheduling information. The control resources may include PDCCH candidates, CCEs, search spaces, and CORESETs. In one example, the scheduled entity may determine the relative timing positions of the slots based on the association between a PDCCH candidate and a slot index and/or starting symbol index of the PDSCH/PUSCH on the scheduled carrier. In one example, the scheduled entity 1100 may determine the relative timing positions of the slots based on the association between a CCE allocation of a PDCCH candidate and a slot index on the scheduled carrier. The relative timing positions indicate the time-based order of the plurality of slots including a PDSCH/PUSCH. The plurality of slots may be the same as the slots of the second carrier 804 described above in relation to FIG. 8. For example, slot0 through slot7 of the second carrier 804 occur at different timing positions.

In some examples, the control resources include a plurality of physical downlink control channel (PDCCH) candidates that are respectively associated with slot indexes of the plurality of slots. In some examples, the plurality of PDCCH candidates include a first PDCCH candidate associated with a first slot of the plurality of slots, and a second PDCCH candidate associated with a second slot of the plurality of slots, and the first slot is earlier in time than the second slot. In some examples, each of the slot indexes is configured to indicate a respective slot of the plurality of slots including a physical downlink shared channel (PDSCH) or a physical uplink shared channel (PUSCH), relative to an initial slot on the first carrier including the plurality of PDCCH candidates. In some examples, each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

In some examples, the control resources include a plurality of physical downlink control channel (PDCCH) candidates, and a control channel element (CCE) allocation of the PDCCH candidates is dependent on the slot indexes of the plurality of slots. In some examples, the scheduled entity may further receive control information that indicates the association between the control resources and the plurality of slots using at least one of radio resource control signaling, medium access control (MAC) control element (MAC-CE), or downlink control information. For example, the scheduling circuit 1642 shown and described above in connection with FIG. 16 may provide a means to determine relative timing positions of the plurality of slots.

At block 1806, the scheduled entity may decode the scheduling information in an order based on the relative timing positions of the plurality of slots. For example, the scheduled entity may decode the scheduling information that schedules a plurality of PDSCH and/or PUSCH transmissions in the plurality of slots. Based on the relative timing positions, the scheduled entity prioritizes processing (e.g., decoding) of the scheduling information of a first slot that is earlier than a second slot.

For example, the control resources may include a plurality of PDCCH candidates respectively associated with the slot index and/or symbol index of the scheduled PDSCH/PUSCH. The scheduled entity may decode a first PDCCH candidate associated with a first slot before decoding a second PDCCH candidate associated with a second slot that is later than the first slot. In some examples, a CCE allocation of a PDCCH candidate may depend on the slot index. In that case, the scheduled entity may decode a PDCCH candidate in a first CCE allocation associated with a first slot before decoding a PDCCH candidate in a second CCE allocation associated with a second slot that is later than the first slot. In some examples, a search space (SS) or CORESET may depend on the slot index. In that case, the scheduled entity may decode a PDCCH candidate in a first SS/CORESET associated with a first slot before decoding a PDCCH candidate in a second SS/CORESET associated with a second slot that is later than the first slot. For example, the decoding circuit 1644 shown and described above in connection with FIG. 16 may provide a means to decode the scheduling information.

At block 1808, the scheduled entity may communicate the plurality of data transmissions (e.g., PDSCH and/or PUSCH) according to a predetermined minimum delay between the control resources of the first carrier and the plurality of slots of the second carrier. In some examples, the scheduled entity may receive the predetermined minimum delay in a radio resource control message. In some examples, the scheduled entity may receive downlink control information including a table index for looking up the predetermined minimum delay in a table including a plurality of time delays. For example, the scheduling circuit 1642 and DL/UL communication circuit 1640, together with the transceiver 1610, shown and described above in connection with FIG. 16 may provide a means to communicate the plurality of data transmissions.

In one configuration, the apparatus 1300 for wireless communication includes means for performing the processes, procedures, and methods described in relation to FIGS. 8-12, 14, and 15. For example, the apparatus 1300 may include means for generating scheduling information that schedules communication of a plurality of data transmissions with a user equipment (UE) on a plurality of slots of a first carrier comprising a first numerology, each of the plurality of data transmissions corresponding to a respective one of the plurality of slots, and means for transmitting the scheduling information within control resources allocated based on slot indexes of the plurality of slots on a second carrier comprising a second numerology less than the first numerology. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

In one configuration, the apparatus 1600 for wireless communication includes means for performing the processes, procedures, and methods described in relation to FIGS. 8-12, 17, and 18. For example, the apparatus 1600 may include means for receiving scheduling information on a first carrier comprising a first numerology, the scheduling information scheduling communication of a plurality of data transmissions with the UE on a plurality of slots of a second carrier comprising a second numerology greater than the first numerology, each of the plurality of data transmissions corresponding to a respective one of the plurality of slots. The apparatus may further include means for determining relative timing positions of the plurality of slots based on an association between slot indexes of the plurality of slots and control resources allocated to the scheduling information. The apparatus may further include means for decoding the scheduling information in an order based on the relative timing positions of the plurality of slots. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1304/1604 is merely provided as an example, and other means for carrying out the described functions may be included within various aspects of the present disclosure, including but not limited to the instructions stored in the computer-readable storage medium 1306/1606, or any other suitable apparatus or means described in any one of the FIGS. 1 and/or 2, and utilizing, for example, the processes and/or algorithms described herein in relation to FIGS. 8-12, 14, 15, 17, and 18.

The following provides an overview of examples of the present disclosure.

Example 1: A method of wireless communication at a scheduling entity in a wireless communication network, comprising: generating scheduling information that schedules communication of a plurality of data transmissions with a user equipment (UE) on a plurality of slots of a first carrier comprising a first numerology, each of the plurality of data transmissions corresponding to a respective one of the plurality of slots; and transmitting the scheduling information within control resources allocated based on slot indexes of the plurality of slots on a second carrier comprising a second numerology less than the first numerology.

Example 2: The method of example 1, wherein the control resources comprise a plurality of physical downlink control channel (PDCCH) candidates that are respectively associated with the slot indexes of the plurality of slots.

Example 3: The method of example 2, wherein: the plurality of PDCCH candidates comprise a first PDCCH candidate associated with a first slot of the plurality of slots, and a second PDCCH candidate associated with a second slot of the plurality of slots, and the first slot is earlier in time than the second slot.

Example 4: The method of example 2 or 3, wherein each of the slot indexes is configured to indicate a respective slot of the plurality of slots including a physical downlink shared channel (PDSCH) or a physical uplink shared channel (PUSCH), relative to an initial slot on the second carrier including the plurality of PDCCH candidates.

Example 5: The method of example 2 or 3, wherein each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

Example 6: The method of any of examples 1 through 5, wherein the control resources comprise a plurality of physical downlink control channel (PDCCH) candidates, and a control channel element (CCE) allocation of the PDCCH candidates is dependent on the slot indexes of the plurality of slots.

Example 7: The method of any of examples 1 through 6, wherein the transmitting the scheduling information comprises: transmitting a first part of the scheduling information using a first set of the control resources that are associated with a first slot of the plurality of slots; and transmitting a second part of the scheduling information using a second set of the control resources that are associated with a second slot of the plurality of slots.

Example 8: The method of example 7, wherein each of the first set of the control resources and the second set of the control resources comprises a search space or a control resource set.

Example 9: The method of any of examples 1 through 8, further comprising: transmitting control information to indicate an association between the control resources and the plurality of slots using at least one of: radio resource control signaling; a medium access control (MAC) control element (MAC-CE); or downlink control information.

Example 10: The method of any of examples 1 through 9, further comprising: configuring the UE to communicate the plurality of data transmissions according to a predetermined minimum delay between the control resources of the second carrier and the plurality of slots of the first carrier.

Example 11: The method of example 10, further comprising: transmitting the predetermined minimum delay in a radio resource control message.

Example 12: The method of example 10 or 11, further comprising: transmitting downlink control information comprising a table index identifying a time delay included in a corresponding row in a table comprising a plurality of time delays.

Example 13: The method of example 12, wherein the time delay is valid when the time delay is greater than or equal to the predetermined minimum delay.

Example 14: The method of example 12, wherein the time delay is a delta value to be added to the predetermined minimum time delay by the UE.

Example 15: An apparatus configured for wireless communication comprising a processor, and a memory coupled to the processor, the processor and memory configured to perform a method of any one of examples 1 through 14.

Example 16: An apparatus configured for wireless communication comprising at least one means for performing a method of any one of examples 1 through 14.

Example 17: A non-transitory computer-readable medium storing computer-executable code, comprising code for causing an apparatus to perform a method of any one of examples 1 through 14.

Example 18: A method of wireless communication at a user equipment (UE) in a wireless communication network, comprising: receiving scheduling information on a first carrier comprising a first numerology, the scheduling information scheduling communication of a plurality of data transmissions with the UE on a plurality of slots of a second carrier comprising a second numerology greater than the first numerology, each of the plurality of data transmissions corresponding to a respective one of the plurality of slots; determining relative timing positions of the plurality of slots based on an association between the plurality of slots and control resources allocated to the scheduling information; and decoding the scheduling information in an order based on the relative timing positions of the plurality of slots.

Example 19: The method of example 18, wherein the control resources comprise a plurality of physical downlink control channel (PDCCH) candidates that are respectively associated with slot indexes of the plurality of slots.

Example 20: The method of example 19, wherein: the plurality of PDCCH candidates comprise a first PDCCH candidate associated with a first slot of the plurality of slots, and a second PDCCH candidate associated with a second slot of the plurality of slots, and the first slot is earlier in time than the second slot.

Example 21: The method of example 19, wherein each of the slot indexes is configured to indicate a respective slot of the plurality of slots including a physical downlink shared channel (PDSCH) or a physical uplink shared channel (PUSCH), relative to an initial slot on the first carrier including the plurality of PDCCH candidates.

Example 22: The method of example 19, wherein each of the slot indexes is configured to indicate a respective slot of the plurality of slots including a physical downlink shared channel (PDSCH) or a physical uplink shared channel (PUSCH), relative to a frame or a subframe on the second carrier including the plurality of PDCCH candidates.

Example 23: The method of any of examples 18 through 22, wherein the control resources comprise a plurality of physical downlink control channel (PDCCH) candidates, and a control channel element (CCE) allocation of the PDCCH candidates is dependent on slot indexes of the plurality of slots.

Example 24: The method of any of examples 18 through 23, wherein the receiving the scheduling information comprises: receiving a first part of the scheduling information using a first set of the control resources that are associated with a first slot of the plurality of slots; and receiving a second part of the scheduling information using a second set of the control resources that are associated with a second slot of the plurality of slots.

Example 25: The method of example 24, wherein each of the first set of the control resources and the second set of the control resources comprises a search space or a control resource set.

Example 26: The method of any of examples 18 through 25, further comprising: receiving control information that indicates the association between the control resources and the plurality of slots using at least one of: radio resource control signaling; medium access control (MAC) control element (MAC-CE); or downlink control information.

Example 27: The method of any of examples 18 through 26, further comprising: communicating the plurality of data transmissions according to a predetermined minimum delay between the control resources of the first carrier and the plurality of slots of the second carrier.

Example 28: The method of example 27, further comprising: receiving the predetermined minimum delay in a radio resource control message.

Example 29: The method of example 27 or 28, further comprising: receiving downlink control information comprising the scheduling information and a respective table index identifying a respective time delay for each of the plurality of data transmissions included in a respective corresponding row in a table comprising a plurality of time delays.

Example 30: The method of example 29, further comprising: treating each of the respective time delays as valid when the respective time delay is greater than or equal to the predetermined minimum delay; and ignoring the scheduling information for each of the plurality of data transmissions for which the respective time delay is less than the predetermined minimum delay.

Example 31: The method of example 29, further comprising: adding the respective time delay for each of the plurality of data transmissions to the predetermined minimum time delay to identify respective actual time delays for each of the plurality of data transmissions.

Example 32: A user equipment (UE) configured for wireless communication comprising a processor, and a memory coupled to the processor, the processor and memory configured to perform a method of any one of examples 18 through 31.

Example 33: An apparatus configured for wireless communication comprising at least one means for performing a method of any one of examples 18 through 31.

Example 34: A non-transitory computer-readable medium storing computer-executable code, comprising code for causing an apparatus to perform a method of any one of examples 18 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity in a wireless communication network, comprising:
   generating scheduling information that schedules communication of a plurality of data transmissions with a user equipment (UE) on a plurality of scheduled slots of a first carrier comprising a first numerology, each of the plurality of data transmissions corresponding to a respective one of the plurality of scheduled slots; and
   transmitting, in a scheduling slot of a second carrier comprising a second numerology less than the first numerology, the scheduling information within control resources of the scheduling slot allocated based on an association between the control resources and slot indexes of the plurality of scheduled slots.

2. The method of claim 1, wherein the control resources of the scheduling slot comprise a plurality of physical downlink control channel (PDCCH) candidates that are respectively associated with the slot indexes of the plurality of scheduled slots.

3. The method of claim 2, wherein:
   the plurality of PDCCH candidates comprise a first PDCCH candidate associated with a first slot of the plurality of scheduled slots, and a second PDCCH candidate associated with a second slot of the plurality of scheduled slots, and
   the first slot is earlier in time than the second slot.

4. The method of claim 2, wherein each of the slot indexes is configured to indicate a respective slot of the plurality of scheduled slots including a physical downlink shared channel (PDSCH) or a physical uplink shared channel (PUSCH), relative to an initial slot on the second carrier including the plurality of PDCCH candidates.

5. The method of claim 2, wherein each of the slot indexes is configured to indicate a respective slot of the plurality of scheduled slots including a physical downlink shared channel (PDSCH) or a physical uplink shared channel (PUSCH), relative to a frame or a subframe on the second carrier including the plurality of PDCCH candidates.

6. The method of claim 1, wherein the control resources comprise a plurality of physical downlink control channel (PDCCH) candidates, and a control channel element (CCE) allocation of the PDCCH candidates is dependent on the slot indexes of the plurality of scheduled slots.

7. The method of claim 1, wherein the transmitting the scheduling information comprises:
   transmitting a first part of the scheduling information using a first set of the control resources that are associated with a first slot of the plurality of scheduled slots; and
   transmitting a second part of the scheduling information using a second set of the control resources that are associated with a second slot of the plurality of scheduled slots.

8. The method of claim 7, wherein each of the first set of the control resources and the second set of the control resources comprises a search space or a control resource set.

9. The method of claim 1, further comprising:
   transmitting control information to indicate an association between the control resources and the plurality of scheduled slots using at least one of:
   radio resource control signaling;
   a medium access control (MAC) control element (MAC-CE); or
   downlink control information.

10. The method of claim 1, further comprising:
    configuring the UE to communicate the plurality of data transmissions according to a predetermined minimum delay between the control resources of the second carrier and the plurality of scheduled slots of the first carrier.

11. The method of claim 10, further comprising:
    transmitting the predetermined minimum delay in a radio resource control message.

12. The method of claim 10, further comprising:
    transmitting downlink control information comprising a table index identifying a time delay included in a corresponding row in a table comprising a plurality of time delays.

13. The method of claim 12, wherein the time delay is valid when the time delay is greater than or equal to the predetermined minimum delay.

14. The method of claim 12, wherein the time delay is a delta value to be added to the predetermined minimum delay by the UE.

15. A method of wireless communication at a user equipment (UE) in a wireless communication network, comprising:
    receiving scheduling information in a scheduling slot of a first carrier comprising a first numerology, the scheduling information scheduling communication of a plurality of data transmissions with the UE on a plurality of scheduled slots of a second carrier comprising a second numerology greater than the first numerology, each of the plurality of data transmissions corresponding to a respective one of the plurality of scheduled slots;
    determining relative timing positions of the plurality of scheduled slots based on an association between slot indexes of the plurality of scheduled slots and control resources allocated to the scheduling information; and decoding the scheduling information in an order based on the relative timing positions of the plurality of scheduled slots.

16. The method of claim 15, wherein the control resources comprise a plurality of physical downlink control channel (PDCCH) candidates that are respectively associated with the slot indexes of the plurality of scheduled slots.

17. The method of claim 16, wherein:
the plurality of PDCCH candidates comprise a first PDCCH candidate associated with a first slot of the plurality of scheduled slots, and a second PDCCH candidate associated with a second slot of the plurality of scheduled slots, and
the first slot is earlier in time than the second slot.

18. The method of claim 16, wherein each of the slot indexes is configured to indicate a respective slot of the plurality of scheduled slots including a physical downlink shared channel (PDSCH) or a physical uplink shared channel (PUSCH), relative to an initial slot on the first carrier including the plurality of PDCCH candidates.

19. The method of claim 16, wherein each of the slot indexes is configured to indicate a respective slot of the plurality of scheduled slots including a physical downlink shared channel (PDSCH) or a physical uplink shared channel (PUSCH), relative to a frame or a subframe on the second carrier including the plurality of PDCCH candidates.

20. The method of claim 15, wherein the control resources comprise a plurality of physical downlink control channel (PDCCH) candidates, and a control channel element (CCE) allocation of the PDCCH candidates is dependent on the slot indexes of the plurality of scheduled slots.

21. The method of claim 15, wherein the receiving the scheduling information comprises:
receiving a first part of the scheduling information using a first set of the control resources that are associated with a first slot of the plurality of scheduled slots; and
receiving a second part of the scheduling information using a second set of the control resources that are associated with a second slot of the plurality of scheduled slots.

22. The method of claim 21, wherein each of the first set of the control resources and the second set of the control resources comprises a search space or a control resource set.

23. The method of claim 15, further comprising:
receiving control information that indicates the association between the control resources and the plurality of scheduled slots using at least one of:
radio resource control signaling;
medium access control (MAC) control element (MAC-CE); or
downlink control information.

24. The method of claim 15, further comprising:
communicating the plurality of data transmissions according to a predetermined minimum delay between the control resources of the first carrier and the plurality of scheduled slots of the second carrier.

25. The method of claim 24, further comprising:
receiving the predetermined minimum delay in a radio resource control message.

26. The method of claim 25, further comprising:
receiving downlink control information comprising the scheduling information and a respective table index identifying a respective time delay for each of the plurality of data transmissions included in a respective corresponding row in a table comprising a plurality of time delays.

27. The method of claim 24, further comprising:
treating each of the respective time delays as valid when the respective time delay is greater than or equal to the predetermined minimum delay; and
ignoring the scheduling information for each of the plurality of data transmissions for which the respective time delay is less than the predetermined minimum delay.

28. The method of claim 24, further comprising:
adding the respective time delay for each of the plurality of data transmissions to the predetermined minimum delay to identify respective actual time delays for each of the plurality of data transmissions.

29. An apparatus for cross-carrier scheduling in a wireless communication network, comprising:
a transceiver configured to communicate with a user equipment (UE) using a first carrier comprising a first numerology and a second carrier comprising a second numerology less than the first numerology;
a memory; and
a processor coupled to the transceiver and the memory, the processor and the memory being configured to:
generate scheduling information that schedules communication of a plurality of data transmissions with the UE on a plurality of scheduled slots of the first carrier, each of the plurality of data transmissions corresponding to a respective one of the plurality of scheduled slots; and
transmit, in a scheduling slot of the second carrier, the scheduling information within control resources of the scheduling slot allocated based on an association between the control resources and slot indexes of the plurality of scheduled slots.

30. A user equipment (UE) for wireless communication, comprising:
a transceiver configured to communicate with a scheduling entity using a first carrier comprising a first numerology and a second carrier comprising a second numerology greater than the first numerology;
a memory; and
a processor coupled to the transceiver and the memory, the processor and the memory being configured to:
receive scheduling information in a scheduling slot of the first carrier, the scheduling information scheduling communication of a plurality of data transmissions with the UE on a plurality of scheduled slots of the second carrier, each of the plurality of data transmissions corresponding to a respective one of the plurality of scheduled slots;
determine relative timing positions of the plurality of scheduled slots based on an association between slot indexes of the plurality of scheduled slots and control resources allocated to the scheduling information; and
decode the scheduling information in an order based on the relative timing positions of the plurality of scheduled slots.

* * * * *